(12) United States Patent
Fang et al.

(10) Patent No.: US 8,941,978 B2
(45) Date of Patent: Jan. 27, 2015

(54) FLAT PANEL DISPLAY REMOTE-CONTROLLED VIEWING ANGLE ADJUSTMENT SYSTEM

(76) Inventors: Jin Fang, Taipei (TW); Andrew H. Lew, Taipei (TW)

( * ) Notice: Subject to any disclaimer, the term of this patent is extended or adjusted under 35 U.S.C. 154(b) by 48 days.

(21) Appl. No.: 13/598,146

(22) Filed: Aug. 29, 2012

(65) Prior Publication Data

US 2013/0038991 A1    Feb. 14, 2013

Related U.S. Application Data

(63) Continuation-in-part of application No. PCT/IB2010/002721, filed on Oct. 25, 2010.

(51) Int. Cl.
*H05K 5/00* (2006.01)
*H05K 7/00* (2006.01)
*A47G 29/00* (2006.01)
*H04N 7/14* (2006.01)
*H04N 5/14* (2006.01)
*H04N 5/655* (2006.01)
*F16M 13/02* (2006.01)
*F16M 11/08* (2006.01)
*F16M 11/18* (2006.01)
*F16M 11/20* (2006.01)

(52) U.S. Cl.
CPC ............... *H04N 5/655* (2013.01); *F16M 13/02* (2013.01); *F16M 11/08* (2013.01); *F16M 11/18* (2013.01); *F16M 11/2014* (2013.01)
USPC ............ 361/679.06; 361/679.04; 361/679.07; 361/679.21; 361/679.27; 361/679.44; 361/679.45; 248/80; 248/81; 248/82; 348/14.07; 348/25

(58) Field of Classification Search
CPC ..... G06F 1/16; G06F 1/33225; H05K 5/0026; H05K 5/026; H05K 2201/10159
USPC .......................... 361/679.01–679.09, 679.3, 361/679.1–679.19, 679.21–679.29, 361/679.31–679.45, 679.55–679.6, 361/724–747; 455/575.1, 575.3, 575.4, 455/575.8; 369/282, 291, 253, 44.16, 75.5; 248/80–88, 155.1–155.5, 166–173, 248/180.1–186.2, 229.1–231.51, 271.4, 248/292.14, 316.1–316.8; 348/14.07, 348/51–52, 177, 333.01–333.13, 739
See application file for complete search history.

(56) References Cited

U.S. PATENT DOCUMENTS

2008/0272256 A1* 11/2008 Oh ............................ 248/281.11
2009/0065670 A1*  3/2009 Wu et al. ..................... 248/284.1
2010/0172108 A1*  7/2010 Yang ............................ 361/728

* cited by examiner

*Primary Examiner* — Jerry Wu
(74) *Attorney, Agent, or Firm* — Hamre, Schumann, Mueller & Larson, P.C.

(57) ABSTRACT

A flat panel display remote-controlled viewing angle adjustment system (1) comprising a support assembly (2) for supporting a flat panel display (9), an electrical driving assembly for driving the support assembly (2), and an angular control assembly attached to the support assembly (2). The adjustable system (1) is configured such that when the electrical driving assembly is started, the flat panel display (9) is rotated about a vertical axis that passes through one of the left side and the right side of the flat panel display (9) and only when the flat panel display (9) returns to zero angle position can it rotate about a vertical axis that passes through the other of the left side and the right side of the flat panel display (9).

6 Claims, 30 Drawing Sheets

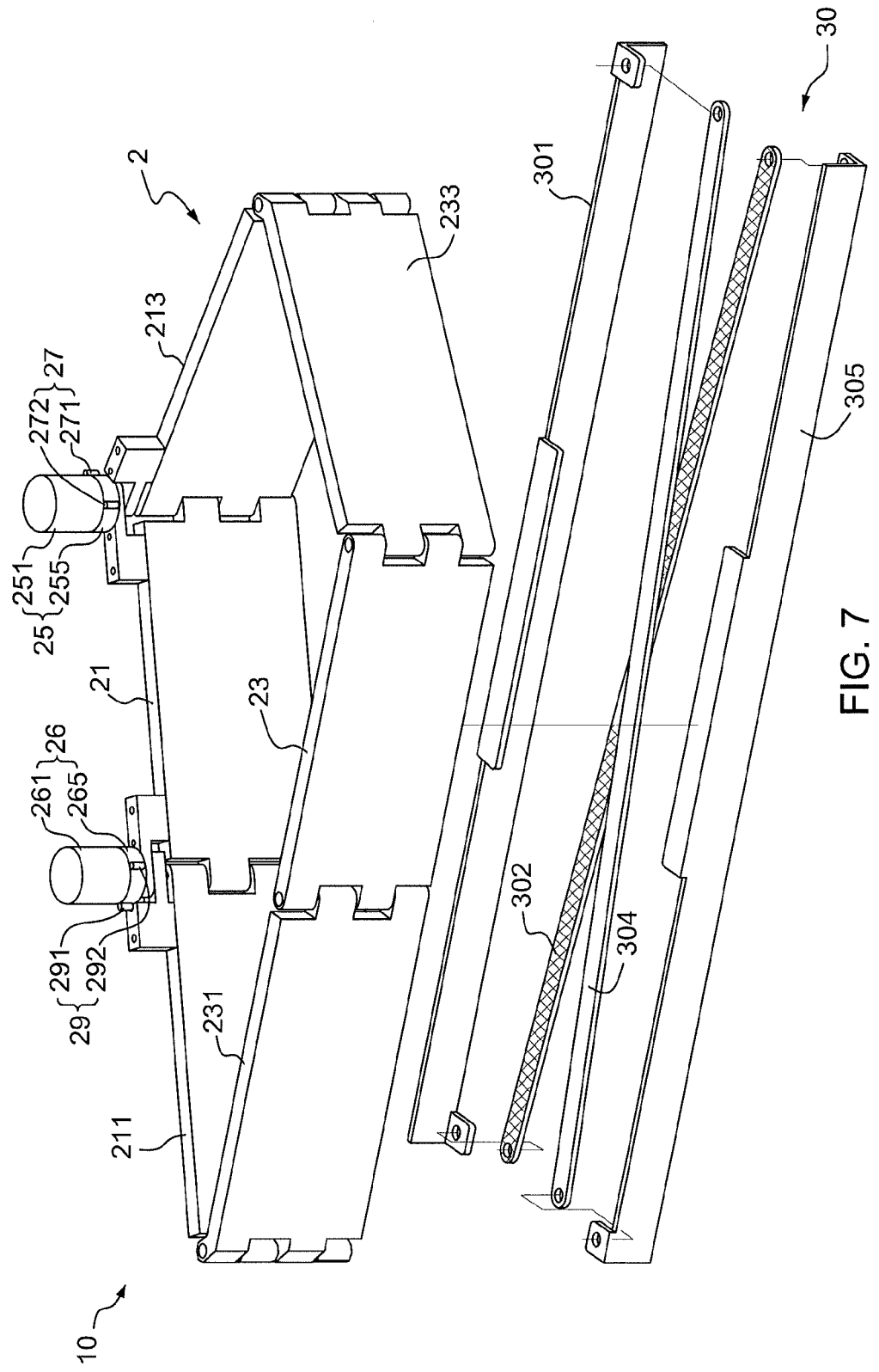

FLAT PANEL DISPLAY REMOTE-CONTROLLED VIEWING ANGLE ADJUSTMENT SYSTEM

TECHNICAL FIELD

The present invention generally relates to a flat panel display remote-controlled viewing angle adjustment system, and more particularly to such a device for which the viewing angle of the flat panel display can be remotely adjusted.

BACKGROUND OF INVENTION

Flat panel displays, such as LCD and plasma television, have become increasingly popular and now almost dominate the market which used to belong to traditional CRT. Because flat panel displays are thin in profile, they are often mounted on walls, brackets, or other vertical flat surfaces in order to save space. For a better viewing angle, flat panel displays are often mounted on a support device which can be rotated to a desired angle. Numerous patents directed to mounting devices allow the viewing angle to be adjusted can be found.

U.S. Pat. No. 7,296,774 (Sung I. Oh) is directed to a viewing angle adjustment system, which provides a support arm to couple a monitor to a surface such as a wall or ceiling to remotely adjust the viewing angle of the monitor. The support arm includes at least one motor along a pivot axis in the support arm. The motor can be activated by a processor that receives the control signal provided by a remote control. The support arm may include a plurality of pivot axes with a motor mounted on each of the pivot axes to adjust the viewing angle with respect to the vertical and horizontal planes.

US 2007/0125917A1 (Sung Il Oh et al.) is directed to a motorized mount system for repositioning a monitor capable of extending a monitor from a reference plane, and tilting and swiveling the monitor in reference to X, Y, and Z axes. The motorized mount system includes a first pair of arms between a base plate and an adapter plate. The base plate is adapted to attach to a wall and the adapter plate is adapted to attach to a back side of the monitor. The first pair of arms includes two pivoting arms which are symmetrical with respect to each other. The proximal ends of the two pivoting arms are pivotally coupled to the base plate and the distal ends of the two pivoting arms are pivotally coupled to the adapter plate. At least one of the proximal ends of the first pair of arms can be engaged with a motor to rotate the distal end about its axis, which in turn extends or retracts the distal ends of the first pair of arms. Another motor can be coupled to the distal end of the first pair of arms to swivel the monitor side to side. Yet another motor can be coupled to the distal end of the first pair of arms to tilt the monitor up and down.

It is noted that the mechanisms shown in the above patents are generally in the form of links or arms. The links or arms have the advantage of structural simplicity, but are weak or too large when they are used to support an object having substantial weight, particularly if they are required to be rotatable. Furthermore, as the display panel gets larger and heavier, the structure of a support device formed of links or arms can be too weak to safely support it.

Furthermore, when the angle of a display is adjusted, the center of gravity of the device as disclosed above will be displaced away from the wall or the surface where the device/display is mounted, and the displacement will impose additional stress on the support device, especially in translational movement, further aggravating the problem of structural weakness of the support device.

U.S. Pat. No. 7,648,112 is directed to a flat panel display mounting device for securing a flat panel display to a support surface. The flat panel display mounting device comprises a plurality of members in the form of support panels pivotally connected together and a rotation control mechanism connected thereto so that the flat panel display mounted on the device can be rotated to a desired angle and the center of gravity of the flat panel display during rotation can be maintained as close to the support surface as possible, so as not to generate additional stress to the flat panel display mounting device. The inventors of the present invention, Jin Fang and Andrew H. Lew, are co-assignees of U.S. Pat. No. 7,648,112, which is incorporated herein by reference. The mechanism of the mounting device disclosed in U.S. Pat. No. 7,648,112 is applied to the present invention with some components added therein to electrically drive and control the mechanism.

SUMMARY OF THE INVENTION

One object of the present invention is to provide a flat panel display remote-controlled viewing angle adjustment system that can overcome the weakness in the structure inherent to most support devices for flat panel displays in which links or arms are used.

Another object of the present invention is to provide a flat panel display remote-controlled viewing angle adjustment system that is motor driven such that the flat panel display remote-controlled viewing angle adjustment system can be operated automatically.

Another object of the present invention is to provide a flat panel display remote-controlled viewing angle adjustment system which is remotely controlled such that a user can easily adjust the viewing angle of the flat display panel.

In one aspect, the present invention is directed to a flat panel display remote-controlled viewing angle adjustment system comprising a support assembly for supporting a flat panel display having six rigid and rectangular panels connected by hinges, an electrical driving assembly for driving the support assembly arranged at the support assembly, and an angular control assembly having two electric stoppers attached to the support assembly. In one embodiment, the electric stoppers are electrically connected with the electrical driving assembly.

In another aspect, the present invention is directed to a flat panel display remote-controlled viewing angle adjustment system comprising a support assembly for supporting a flat panel display having six rigid and rectangular panels connected by hinges, an electrical driving assembly for driving the support assembly arranged at the support assembly, and a angular control assembly which is a rotation control mechanism attached to the support assembly.

In a further aspect, the present invention is directed to a flat panel display remote-controlled viewing angle adjustment system comprising a support assembly for supporting a flat panel display having four rigid and rectangular panels connected by hinges, an electrical driving assembly for driving the support assembly arranged at the support assembly, and an angular control assembly which is a rotation control mechanism attached to the support assembly.

BRIEF DESCRIPTION OF THE DRAWINGS

FIG. 7 shows a third embodiment of the flat panel display remote-controlled viewing angle adjustment system of the present invention.

DETAILED DESCRIPTION OF THE INVENTION

Figure 1:
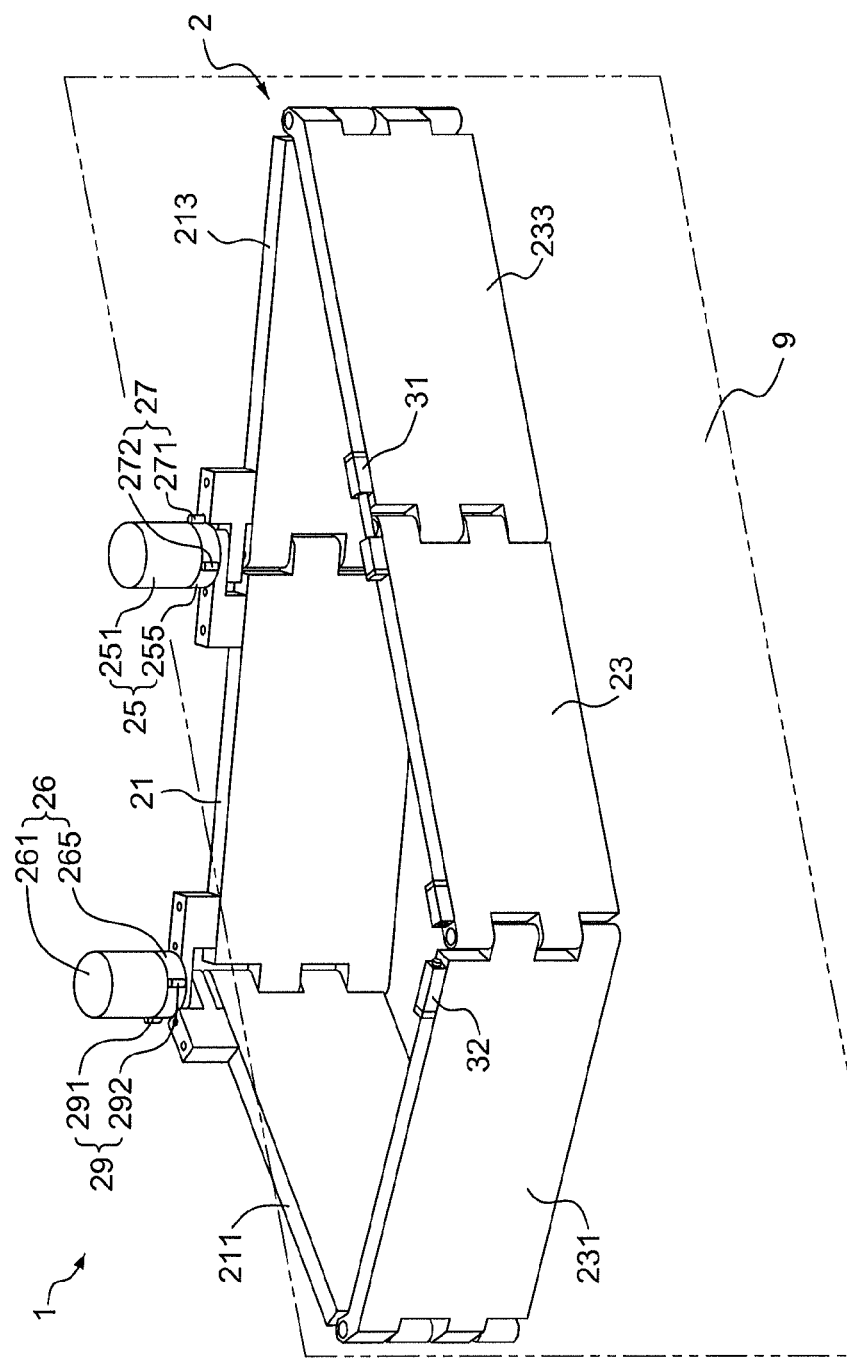
FIG. 1 shows a first embodiment of the flat panel display remote-controlled viewing angle adjustment system of the present invention.

FIG. 1 and FIGS. 2A-2D show a first embodiment of the flat panel display remote-controlled viewing angle adjustment system 1. The system 1 comprises a support assembly 2, which further comprises a base support panel member 21, a display support panel member 23, a first support panel member 233, a second support panel member 213, a third support panel member 231, and a fourth support panel member 211. The base support panel member 21 can be fixed to a support or on a wall and the display support panel member 23 is to support a flat panel display 9. The right edge of the base support panel member 21 is pivotally connected to the left edge of the second support panel member 213 and the left edge of the base support panel member 21 is pivotally connected to the right edge of the fourth support panel member 211. The right edge of the display support panel member 23 is pivotally connected to the left edge of the first support panel member 233 and the left edge of the display support panel member 23 is pivotally connected to the right edge of the third support panel member 231. Moreover, the left edge of the third support panel member 231 is pivotally connected to the left edge of the fourth support panel member 211 and the right edge of the first support panel member 233 is pivotally connected to the right edge of the second support panel member 213.

A first driving mechanism 25 is arranged substantially at the pivot joint of the base support panel member 21 and the second support panel member 213. The first driving mechanism 25 comprises a motor 251 and a gear box 255 for reducing the speed of the motor 251. When the motor 251 is started, the first driving mechanism 25 will drive the second support panel member 213 to rotate about the pivot joint of the second support panel member 213 and the base support panel member 21. A first control unit 27 is arranged substantially at the pivot joint of the base support panel member 21 and the second support panel member 213 and electrically connected to the first driving mechanism 25. In particular, the first control unit 27 is attached to the first driving mechanism 25. Further, the first control unit 27 comprises a first positioning switch 271 and a first limit switch 272.

A second driving mechanism 26 is arranged substantially at the pivot joint of the base support panel member 21 and the fourth support panel member 211. The second driving mechanism 26 comprises a motor 261 and a gear box 265 for reducing the speed of the motor 261. When the motor 261 is started, the second driving mechanism 26 will drive the fourth support panel member 211 to rotate about the pivot joint of the fourth support panel member 211 and the base support panel member 21. A second control unit 29 is arranged substantially at the pivot joint of the base support panel member 21 and the fourth support panel member 211 and electrically connected to the second driving mechanism 26. In particular, the second control unit 29 is attached to the second driving mechanism 26. Further, the second control unit 29 comprises a second positioning switch 291 and a second limit switch 292.

Further, the first driving mechanism 25 and the second driving mechanism 26 can be remotely controlled.

Moreover, a first electric stopper 31 is arranged between the display support panel member 23 and the first support panel member 233, and the second electric stopper 32 is arranged between the display support panel member 23 and the third support panel member 231. The first electric stopper 31 and the second electric stopper 32 are electrically connected to the first driving mechanism 25 and the second driving mechanism 26. In particular, the first electric stopper 31 and the second electric stopper 32 can be solenoid valves.

In addition, the first positioning switch 271 and the first limit switch 272 cooperate with the motor 251. When the first positioning switch 271 or the first limit switch 272 is turned on, the motor 251 will stop. Likewise, the second positioning switch 291 and the second limit switch 292 cooperate with the motor 261 of the second driving mechanism 26. When the second positioning switch 291 or the second limit switch 292 is turned on, the motor 261 will stop.

Further, the first electrical stopper 31 and the second electrical stopper 32 cooperate with the motor 251 and the motor 261. When the first driving mechanism 25 is started, the first electric stopper 31 is set to non-actuate position and the second electric stopper 32 is set to actuate position. When the second driving mechanism 26 is started, the second electric stopper 32 is set to non-actuate position and the first electric stopper 31 is set to actuate position.

Figure 2A:
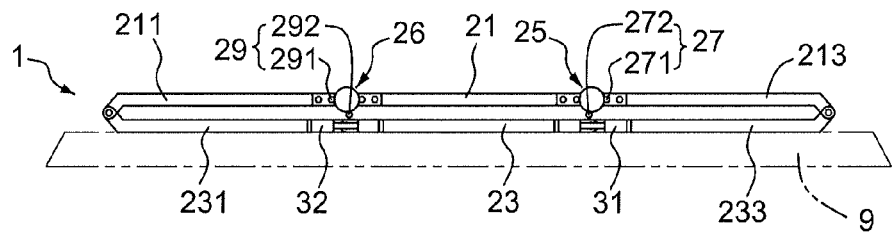
FIGS. 2A-2D show an operating process of the first embodiment of the present invention.
Figure 2B:
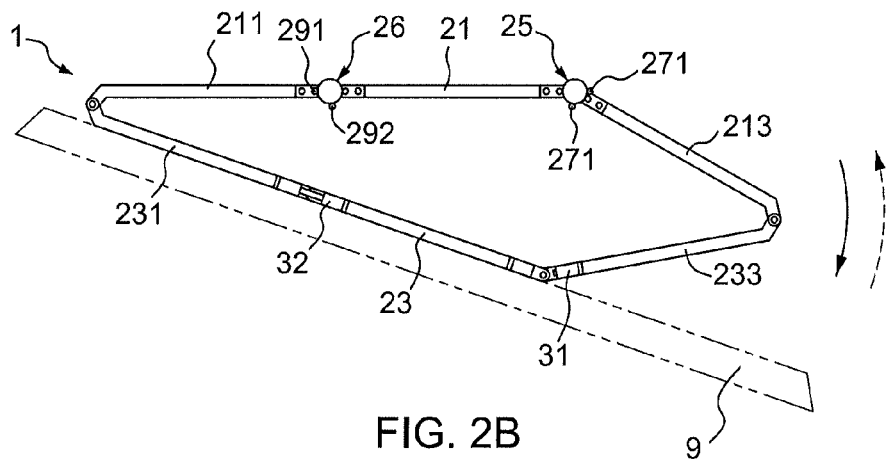
Figure 2C:
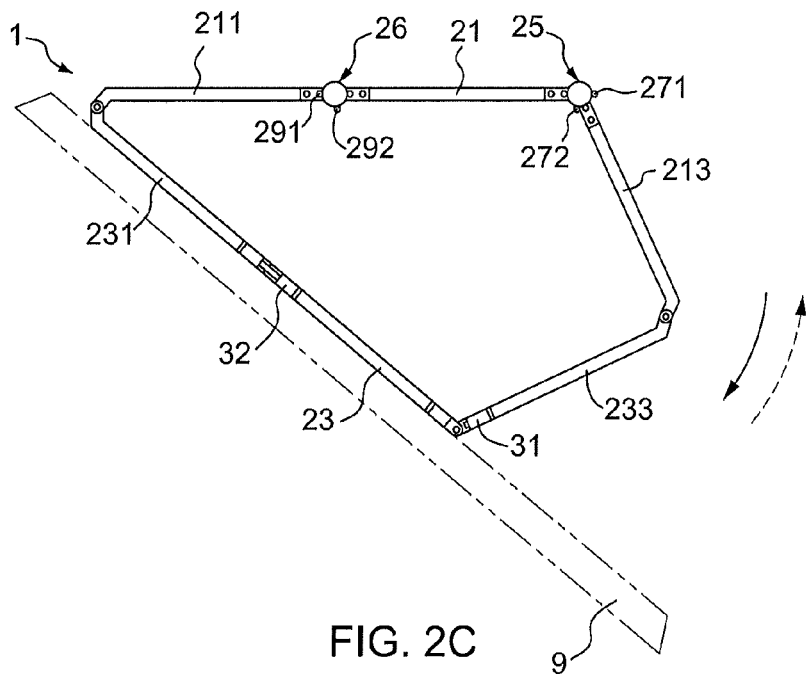

FIGS. 2A-2D show an operating process of the first embodiment of the present invention. As shown in FIG. 2A, when the flat panel display remote-controlled viewing angle adjustment system 1 is at the initial position, the base support panel member 21, the second support panel member 213, and the fourth support panel member 211 form one plane, and the display support panel member 23, the first support panel member 233, and the third support panel member 231 form another plane parallel to and directly in front of the former plane. At this position, the first positioning switch 271 and second positioning switch 291 are in the "on" mode, the first limit switch 272 and the second limit switch 292 are in the "off" mode As shown in FIGS. 2B and 2C, when the first driving mechanism 25 is started, the first electric stopper 31 is set to non-actuate position, the second electric stopper 32 is set to actuate position, and the motor 251 will drive the second support panel member 213 to rotate clockwise about the pivot joint of the second support panel member 213 and the base support panel member 21. The first positioning switch 271 will thus be turned off, and the display support panel member 23 as well as the third support panel member 231 will rotate clockwise about the pivot joint of the third support panel member 231 and the fourth support panel member 211. Therefore, the flat panel display 9 supported on the display support panel member 23 will rotate substantially about its left edge as shown in FIGS. 2A-2D.

Figure 2D:
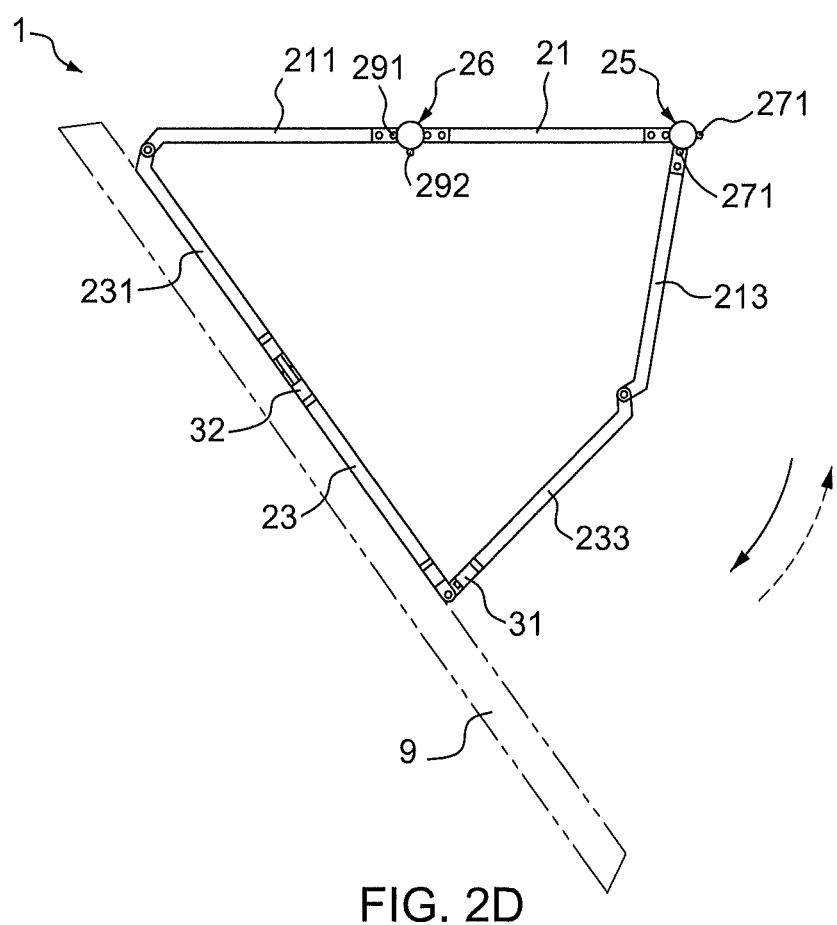

When the flat panel display remote-controlled viewing angle adjustment system 1 continues to rotate to a predetermined angular position (as shown in FIG. 2D), the first limit switch 272 is turned on and the motor 251 will stop, and so will the second support panel member 213.

In the mode that the first limit switch 272 is turned on, if the first driving mechanism 25 is started once more, it will only rotate counter-clockwise. The first driving mechanism 25 will drive the second support panel member 213 to rotate counter-clockwise about the pivot joint of the second support panel member 213 and the base support panel member 21. When the second support panel member 213 is driven to rotate counter-clockwise, the first limit switch 272 will be turned off. Thus, the display support panel member 23 and the third support panel member 231 will rotate counter-clockwise about the pivot joint of the third support panel member 231 and the fourth support panel member 211. As that rotation continues, the flat panel display remote-controlled viewing angle adjustment system 1 will rotate back to the initial position as shown in FIG. 2A, and the first the positioning switch 271 is turned on, and thus the motor 251 will stop.

Figure 3A:
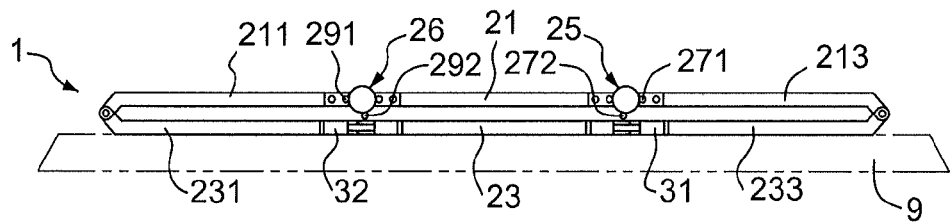
FIGS. 3A-3D show another operating process of the first embodiment of the present invention.
Figure 3B:
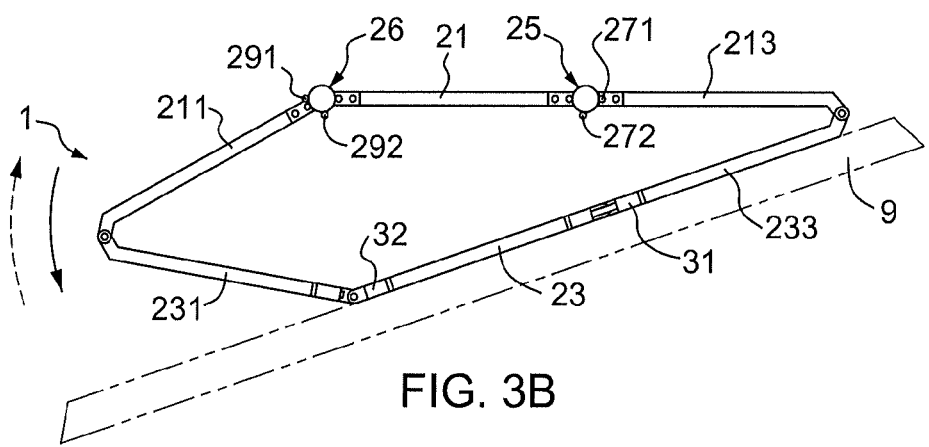
Figure 3C:
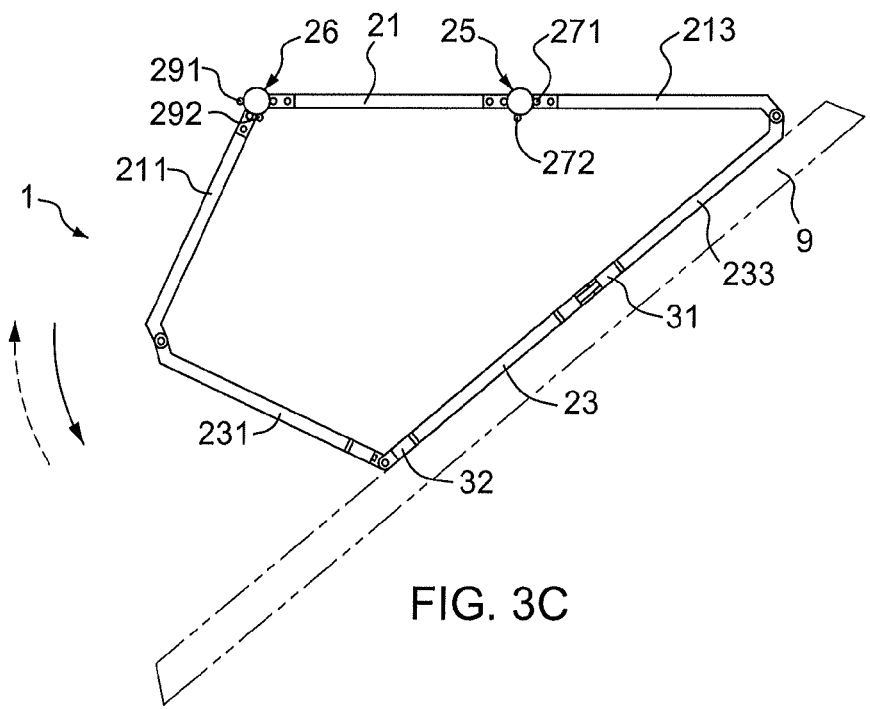

FIGS. 3A-3D show another operating process of the first embodiment of the present invention. As shown in FIG. 3A (a replicate of FIG. 2A), when the flat panel display remote-controlled viewing angle adjustment system 1 is at the initial position, the base support panel member 21, the second support panel member 213, and the fourth support panel member 211 form one plane, and the display support panel member 23, the first support panel member 233, and the third support panel member 231 form another plane parallel to and directly in front of the former plane. At this position, the first positioning switch 271 and second positioning switch 291 are in the "on" mode, the first limit switch 272 and the second limit switch 292 are in the "off" mode. As shown in FIGS. 3B and 3C, when the second driving mechanism 26 is started, the first electric stopper 31 is set to actuate position and the second electric stopper 32 is set to non-actuate position, and the motor 261 will drive the fourth support panel member 211 to rotate counter-clockwise about the pivot joint of the fourth support panel member 211 and the base support panel member 21. The second positioning switch 291 will thus be turned off, and the display support panel member 23 as well as the first support panel member 233 will rotate counter-clockwise about the pivot joint of the first support panel member 233 and the second support panel member 213. Therefore, the flat panel display 9 supported on the display support panel member 23 will rotate substantially about its right edge as shown in FIGS. 3A-3D.

Figure 3D:
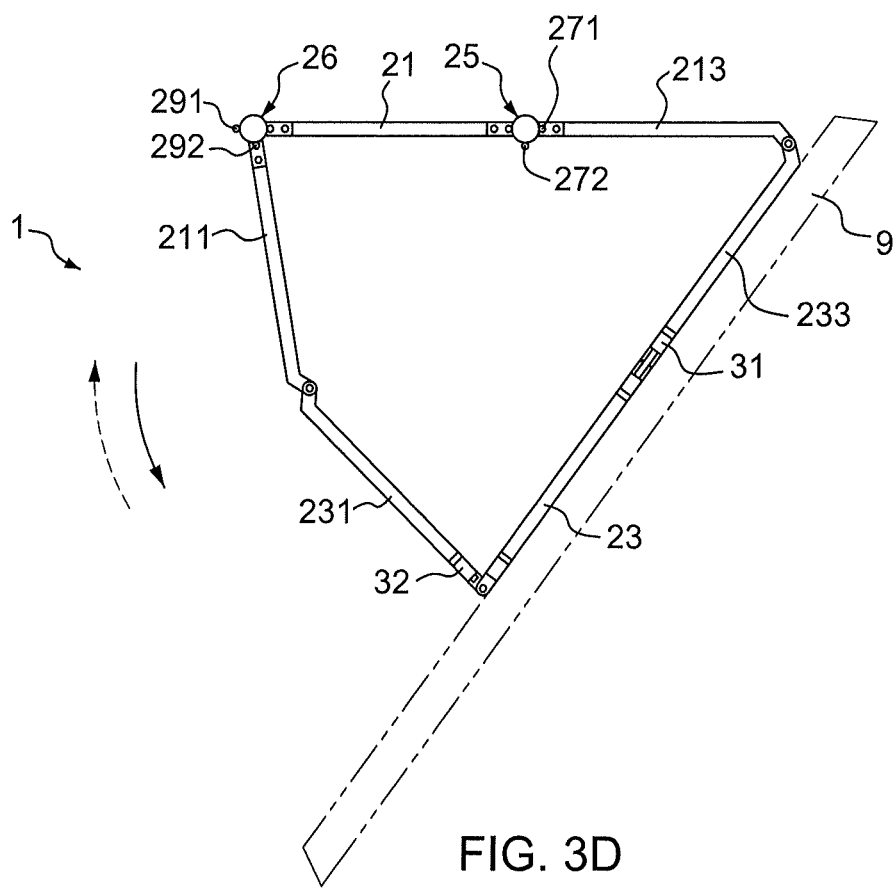

When the flat panel display remote-controlled viewing angle adjustment system 1 continues to rotate to a predetermined angular position (as shown in FIG. 3D), the second limit switch 292 is turned on and the motor 261 will stop, and so will the fourth support panel member 211.

In the mode that the second limit switch 292 is turned on, if the second driving mechanism 26 is started once more, it will only rotate clockwise. The second driving mechanism 26 will drive the fourth support panel member 211 to rotate clockwise about the pivot joint of the fourth support panel member 211 and the base support panel member 21. When the fourth support panel member 211 is driven to rotate clockwise, the second limit switch 292 will be turned off. Thus, the display support panel member 23 and the first support panel member 233 will rotate clockwise about the pivot joint of the first support panel member 233 and the second support panel member 213. As that rotation continues, the flat panel display remote-controlled viewing angle adjustment system 1 will rotate back to the initial position as shown in FIG. 3A, and the second the positioning switch 291 is turned on, and thus the motor 261 will stop.

The above rotating operation ensures a minimum displacement of the center of gravity of the flat panel display 9 away from the surface of the wall or the support. In other words, there is only an angular component of movement of the center of gravity of the flat panel display 9 and no translational component during angular adjustment of the flat panel display 9. Thus, the load, i.e., the combined weight of the flat panel display remote-controlled viewing angle adjustment system 1 and the flat panel display 9 and the moment that it generates and which is exerted on the support assembly 2 during the rotation can be as low as possible.

Figure 4:
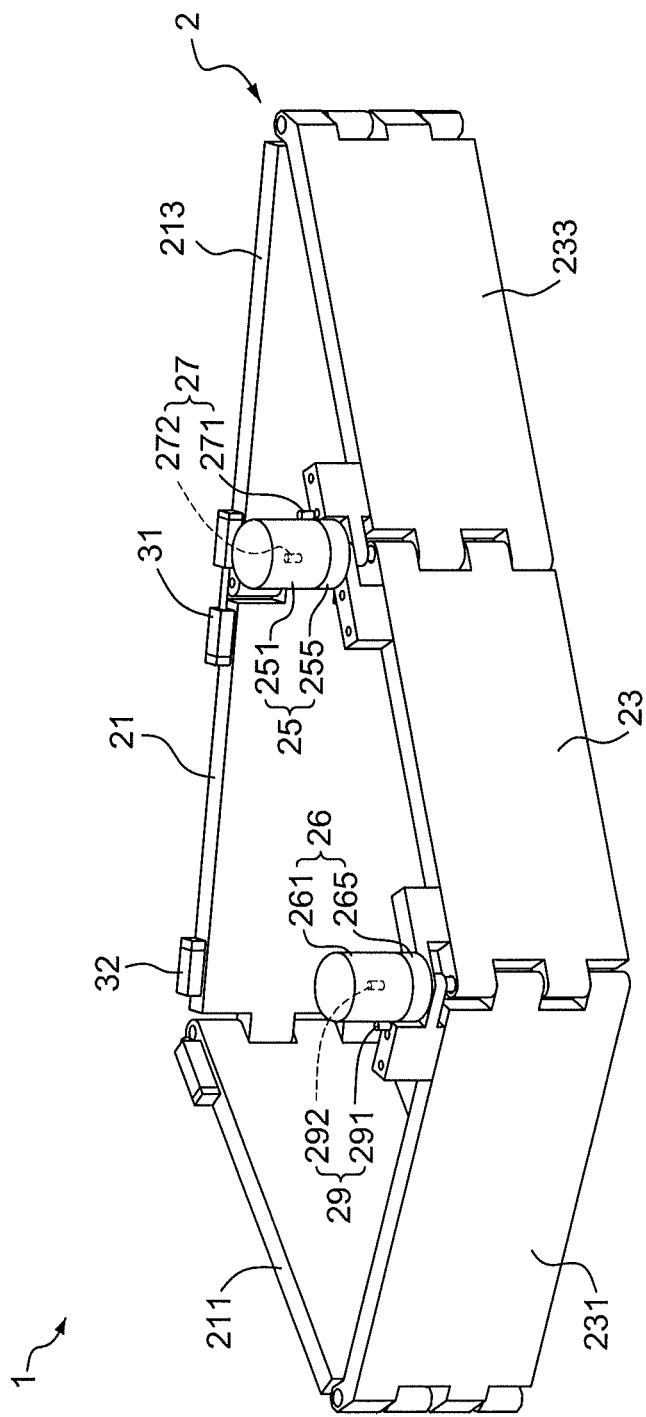
FIG. 4 shows a second embodiment of the flat panel display remote-controlled viewing angle adjustment system of the present invention.

FIG. 4 shows a second embodiment of the flat panel display remote-controlled viewing angle adjustment system 1. The system 1 comprises a support assembly 2, which further comprises a base support panel member 21, a display support panel member 23, a first support panel member 233, a second support panel member 213, a third support panel member 231, and a fourth support panel member 211. The base support panel member 21 can be fixed to a support or on a wall and the display support panel member 23 is to support a flat panel display 9. The right edge of the base support panel member 21 is pivotally connected to the left edge of the second support panel member 213 and the left edge of the base support panel member 21 is pivotally connected to the right edge of the fourth support panel member 211. The right edge of the display support panel member 23 is pivotally connected to the left edge of the first support panel member 233 and the left edge of the display support panel member 23 is pivotally connected to the right edge of the third support panel member 231. Moreover, the left edge of the third support panel member 231 is pivotally connected to the left edge of the fourth support panel member 211 and the right edge of the first support panel member 233 is pivotally connected to the right edge of the second support panel member 213.

A first driving mechanism 25 is arranged substantially at the pivot joint of the first support panel member 233 and the display support panel member 23. The first driving mechanism 25 comprises a motor 251 and a gear box 255 for reducing the speed of the motor 251. When the motor 251 is started, the first driving mechanism 25 will drive the first support panel member 233 to rotate about the pivot joint of the first support panel member 233 and the display support panel member 23. A first control unit 27 is arranged substantially at the pivot joint of the first support panel member 233 and the display support panel member 23 and electrically connected to the first driving mechanism 25. In particular, the first control unit 27 is attached to the first driving mechanism 25. Further, the first control unit 27 comprises a first positioning switch 271 and a first limit switch 272.

A second driving mechanism 26 is arranged substantially at the pivot joint of the third support panel member 231 and the display support panel member 23. The second driving mechanism 26 comprises a motor 261 and a gear box 265 for reducing the speed of the motor 261. When the motor 261 is started, the second driving mechanism 26 will drive the third support panel member 231 to rotate about the pivot joint of the third support panel member 231 and the display support panel member 23. A second control unit 29 is arranged substantially at the pivot joint of the third support panel member 231 and the display support panel member 23 and electrically connected to the second driving mechanism 26. In particular, the second control unit 29 is attached to the second driving mechanism 26. Further, the second control unit 29 comprises a second positioning switch 291 and a second limit switch 292.

Further, the first driving mechanism 25 and the second driving mechanism 26 can be remotely controlled.

Moreover, a first electric stopper 31 is arranged between the base support panel member 21 and the second support panel member 213, and the second electric stopper 32 is arranged between the base support panel member 21 and the fourth support panel member 211. The first electric stopper 31 and the second electric stopper 32 are electrically connected to the first driving mechanism 25 and the second driving mechanism 26. In particular, the first electric stopper 31 and the second electric stopper 32 can be solenoid valves.

In addition, the first positioning switch 271 and the first limit switch 272 cooperate with the motor 251. When the first positioning switch 271 or the first limit switch 272 is turned on, the motor 251 will stop. Likewise, the second positioning switch 291 and the second limit switch 292 cooperate with the motor 261 of the second driving mechanism 26. When the second positioning switch 291 or the second limit switch 292 is turned on, the motor 261 will stop.

Further, the first electrical stopper 31 and the second electrical stopper 32 cooperate with the motor 251 and the motor 261. When the first driving mechanism 25 is started, the first electric stopper 31 is set to non-actuate position and the second electric stopper 32 is set to actuate position. When the second driving mechanism 26 is started, the second electric stopper 32 is set to non-actuate position and the first electric stopper is set to actuate position.

Figure 5A:
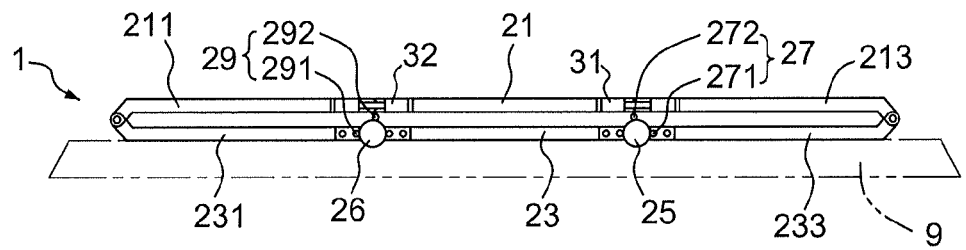
FIGS. 5A-5D show an operating process of the second embodiment of the present invention.
Figure 5B:
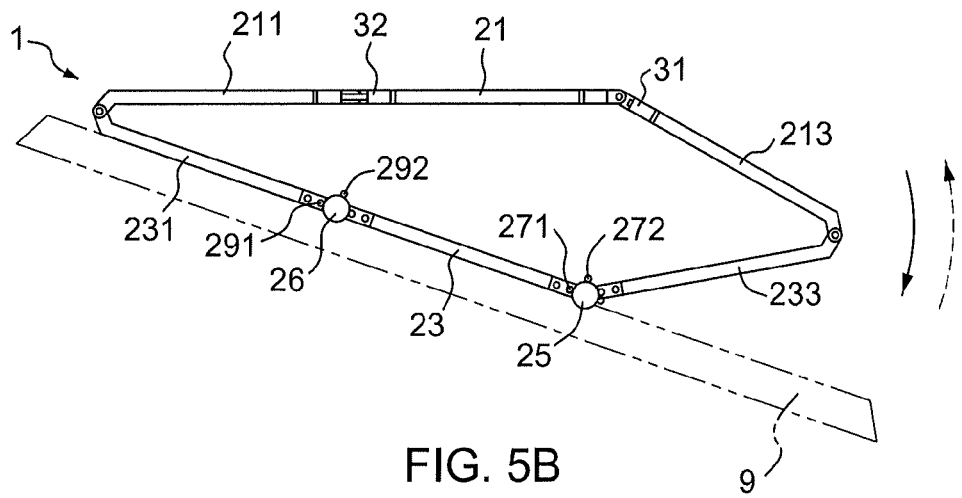
Figure 5C:
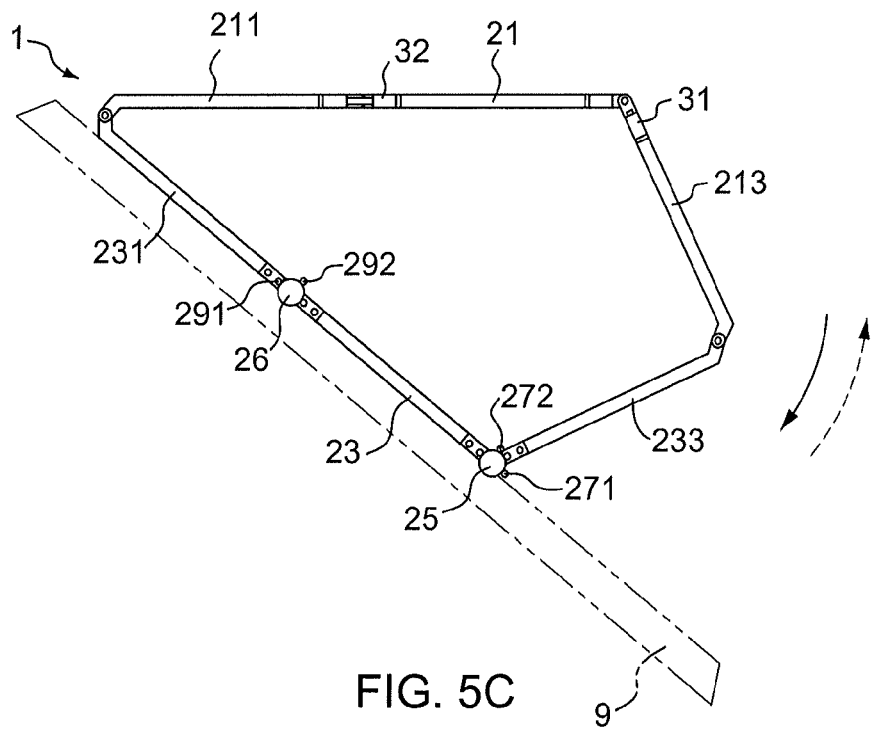

FIGS. 5A-5D show an operating process of the second embodiment of the present invention. As shown in FIG. 5A, when the flat panel display remote-controlled viewing angle adjustment system 1 is at the initial position, the base support panel member 21, the second support panel member 213, and the fourth support panel member 211 form one plane, and the display support panel member 23, the first support panel member 233, and the third support panel member 231 form another plane parallel to and directly in front of the former plane. At this position, the first positioning switch 271 and second positioning switch 291 are in the "on" mode, the first limit switch 272 and the second limit switch 292 are in the "off" mode As shown in FIGS. 5B and 5C, when the first driving mechanism 25 is started, the first electric stopper 31 is set to non-actuate position, the second electric stopper 32 is set to actuate position, and the motor 251 will drive the first support panel member 233 to rotate counter-clockwise about the pivot joint of the first support panel member 233 and the display support panel member 23. The first positioning switch 271 will thus be turned off, and the display support panel member 23 as well as the third support panel member 231 will rotate clockwise about the pivot joint of the third support panel member 231 and the fourth support panel member 211. Therefore, the flat panel display 9 supported on the display support panel member 23 will rotate substantially about its left edge as shown in FIGS. 5A-5D.

Figure 5D:
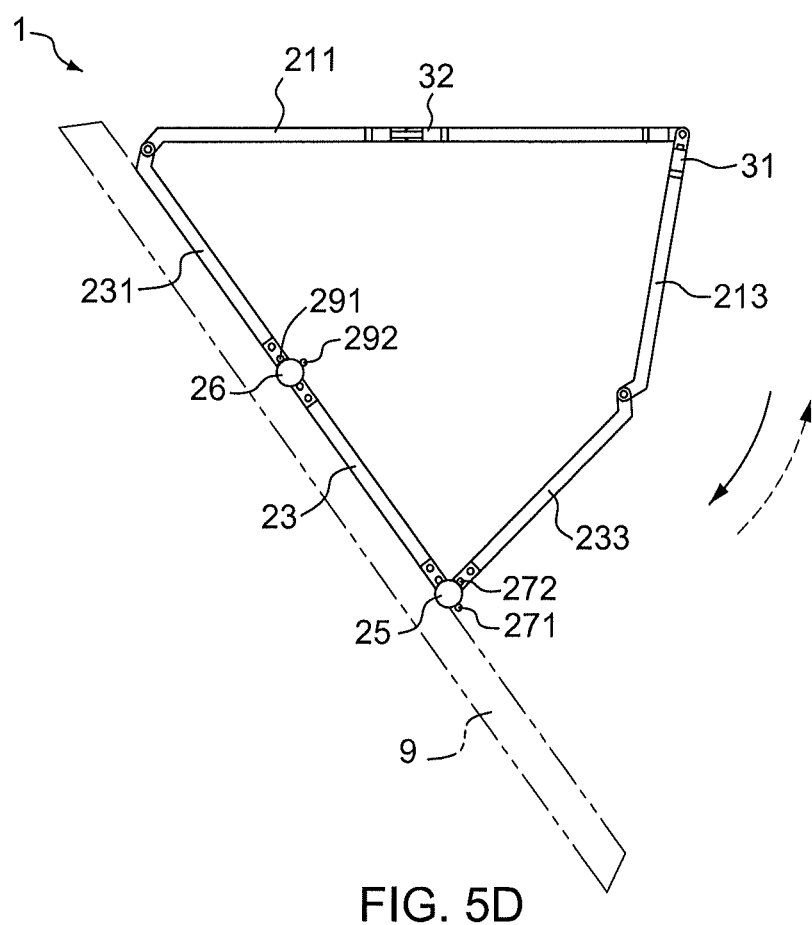

When the flat panel display remote-controlled viewing angle adjustment system 1 continues to rotate to a predetermined angular position (as shown in FIG. 5D), the first limit switch 272 is turned on and the motor 251 will stop, and so will the first support panel member 233.

In the mode that the first limit switch 272 is turned on, if the first driving mechanism 25 is started once more, it will only rotate clockwise. The first driving mechanism 25 will drive the first support panel member 233 to rotate clockwise about the pivot joint of the first support panel member 233 and the display support panel member 23. When the first support panel member 233 is driven to rotate clockwise, the first limit switch 272 will be turned off. Thus, the display support panel member 23 and the third support panel member 231 will rotate counter-clockwise about the pivot joint of the third support panel member 231 and the fourth support panel member 211. As that rotation continues, the flat panel display remote-controlled viewing angle adjustment system 1 will rotate back to the initial position as shown in FIG. 5A, and the first the positioning switch 271 is turned on, and thus the motor 251 will stop.

Figure 6A:
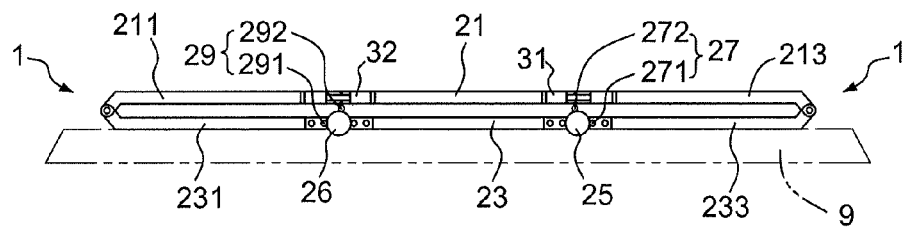
FIGS. 6A-6D show another operating process of the second embodiment of the present invention.
Figure 6B:
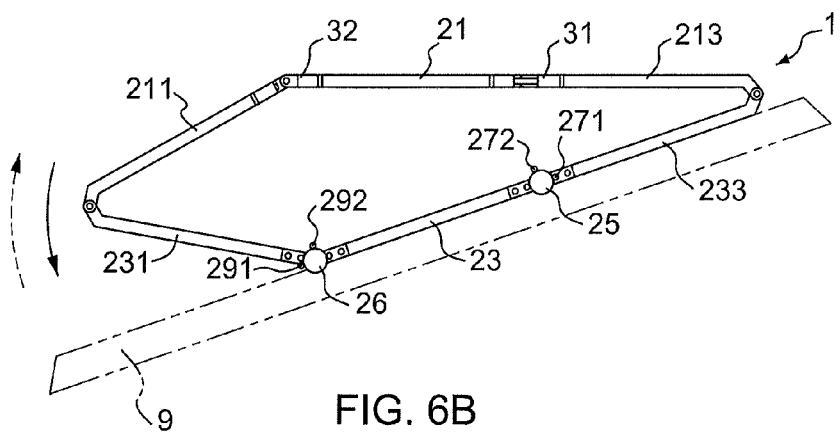
Figure 6C:
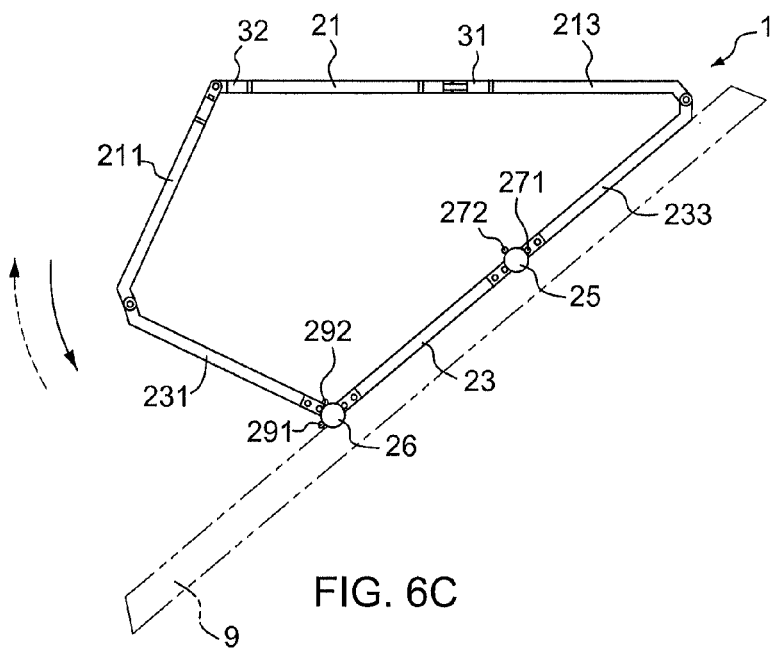

FIGS. 6A-6D show another operating process of the second embodiment of the present invention. As shown in FIG. 6A (a replicate of FIG. 5A), when the flat panel display remote-controlled viewing angle adjustment system 1 is at the initial position, the base support panel member 21, the second support panel member 213, and the fourth support panel member 211 form one plane, and the display support panel member 23, the first support panel member 233, and the third support panel member 231 form another plane parallel to and directly in front of the former plane. At this position, the first positioning switch 271 and second positioning switch 291 are in the "on" mode, the first limit switch 272 and the second limit switch 292 are in the "off" mode. As shown in FIGS. 6B and 6C, when the second driving mechanism 26 is started, the first electric stopper 31 is set to actuate position and the second electric stopper 32 is set to non-actuate position, and the motor 261 will drive the third support panel member 231 to rotate clockwise about the pivot joint of the third support panel member 231 and the display support panel member 23. The second positioning switch 291 will thus be turned off, and the display support panel member 23 as well as the first support panel member 233 will rotate counter-clockwise about the pivot joint of the first support panel member 233 and the second support panel member 213. Therefore, the flat panel display 9 supported on the display support panel member 23 will rotate substantially about its right edge as shown in FIGS. 6A-6D.

Figure 6D:
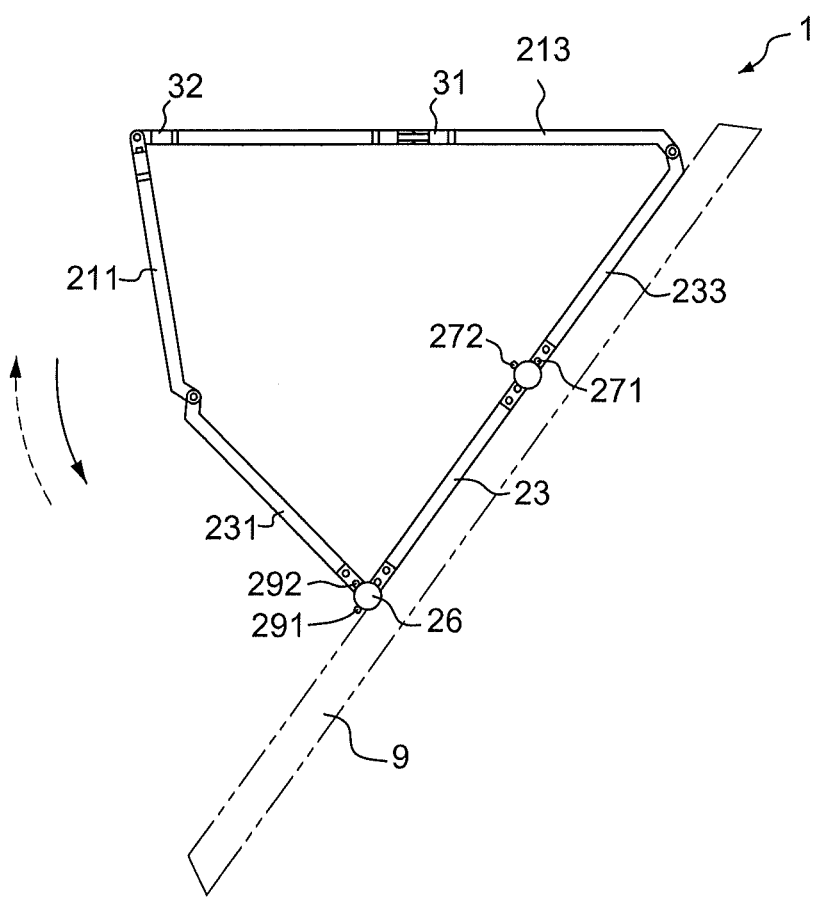

When the flat panel display remote-controlled viewing angle adjustment system 1 continues to rotate to a predetermined angular position (as shown in FIG. 6D), the second limit switch 292 is turned on and the motor 261 will stop, and so will the third support panel member 231.

In the mode that the second limit switch 292 is turned on, if the second driving mechanism 26 is started once more, it will only rotate counter-clockwise. The second driving mechanism 26 will drive the third support panel member 231 to rotate counter-clockwise about the pivot joint of the third support panel member 231 and the display support panel member 23. When the third support panel member 231 is driven to rotate counter-clockwise, the second limit switch 292 will be turned off. Thus, the display support panel member 23 and the first support panel member 233 will rotate clockwise about the pivot joint of the first support panel member 233 and the second support panel member 213. As that rotation continues, the flat panel display remote-controlled viewing angle adjustment system 1 will rotate back to the initial position as shown in FIG. 5A, and the second the positioning switch 291 is turned on, and thus the motor 261 will stop.

The above rotating operation ensures a minimum displacement of the center of gravity of the flat panel display 9 away from the surface of the wall or the support. In other words, there is only angular component of movement of the center of gravity of the flat panel display 9 and no translational component during angular adjustment of the flat panel display 9. Thus, the load, i.e., the combined weight of the flat panel display remote-controlled viewing angle adjustment system 1 and the flat panel display 9 and the moment that it generates and which is exerted on the support assembly 2 during the rotation can be as low as possible.

FIG. 7 shows a third embodiment of the flat panel display remote-controlled viewing angle adjustment system 10. The structures of the support assembly 2, the first driving mechanism 25, the second driving mechanism 26, the first control unit 27, and the second control unit 29 are identical to those of the first embodiment. The difference between the first embodiment and the third embodiment is that the first electrical stopper 31 and the second electrical stopper 32 of the first embodiment are replaced with a rotation control mechanism 30. The rotation control mechanism 30 comprises a base support extension 301, a display support extension 305, a first link 302, and a second link 304. The base support extension 301 is attached to the base support panel member 21 and the display support extension 305 is attached to the display support panel member 23. Further, the left end of the first link 302 is pivotally connected to the left end of the base support extension 301 and the right end of the first link 302 is pivotally connected to the right end of the display support extension 305, and the left end of the second link 304 is pivotally connected to the left end of the display support extension 305 and the right end of the second link 304 is pivotally connected to the right end of the base support extension 301.

Figure 8A:
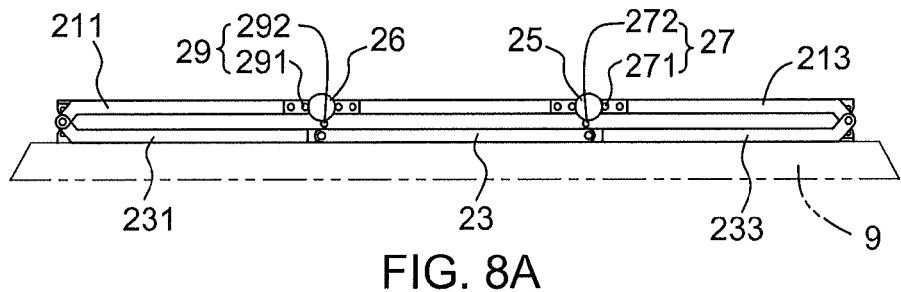
FIGS. 8A-8D show an operating process of the third embodiment of the present invention.
Figure 8B:
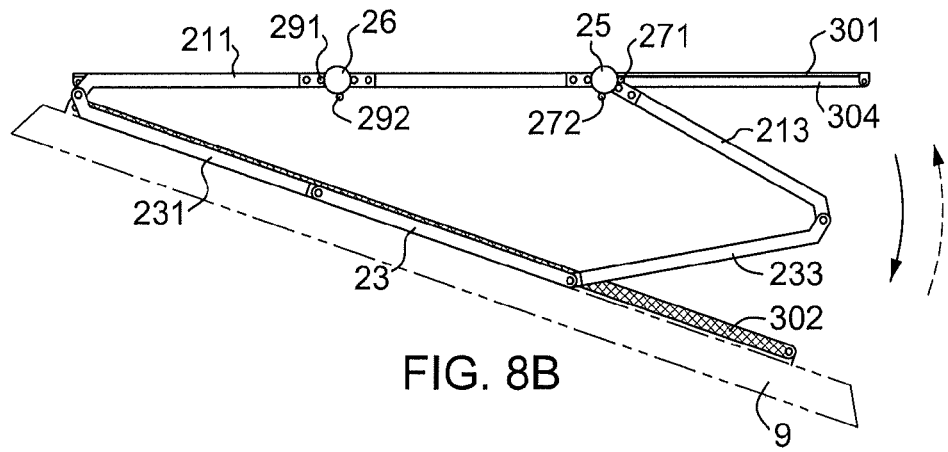
Figure 8C:
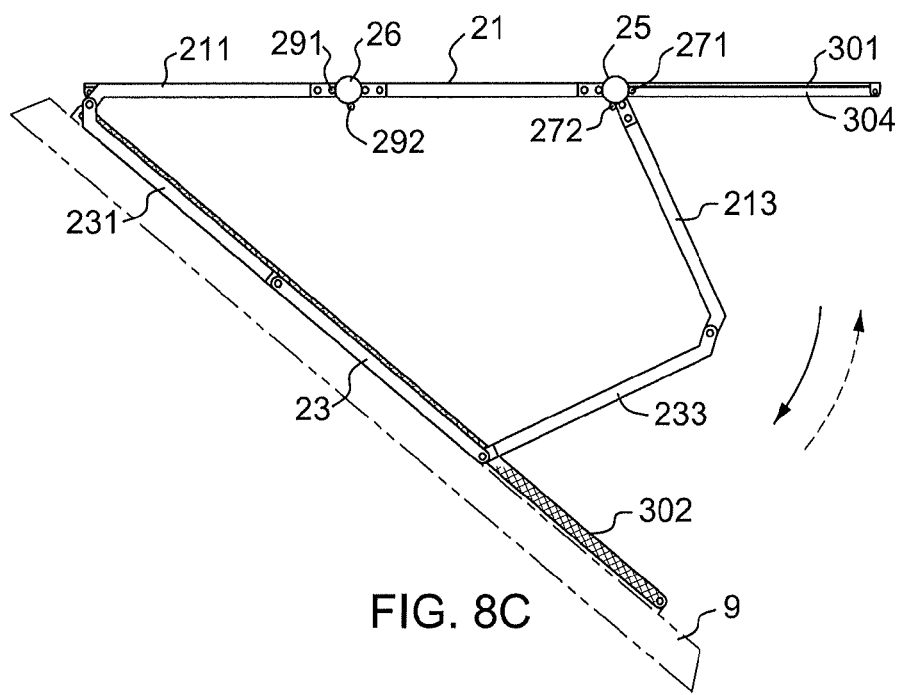

FIGS. 8A-8D show an operating process of the third embodiment of the present invention. As shown in FIG. 8A, when the flat panel display remote-controlled viewing angle adjustment system 10 is at the initial position, the base support panel member 21, the second support panel member 213, and the fourth support panel member 211 form one plane, and the display support panel member 23, the first support panel member 233, and the third support panel member 231 form another plane parallel to and directly in front of the former plane. At this position, the first positioning switch 271 and second positioning switch 291 are in the "on" mode, and the first limit switch 272 and the second limit switch 292 are in the "off" mode. As shown in FIGS. 8B and 8C, when the first driving mechanism 25 is started, the motor 251 will drive the second support panel member 213 to rotate clockwise about the pivot joint of the second support panel member 213 and the base support panel member 21. The first positioning switch 271 will thus be turned off, and the display support panel member 23 as well as the third support panel member 231 will rotate clockwise about the pivot joint of the third support panel member 231 and the fourth support panel member 211. Therefore, the flat panel display 9 supported on the display support panel member 23 will rotate substantially about its left edge as shown in FIGS. 8A-8D.

When the first driving mechanism 25 continues to drive the second support panel member 213 to rotate clockwise, the display support panel member 23 and the third support panel member 231 will rotate clockwise about the pivot joint of the third support panel member 231 and the fourth support panel member 211 and the display support extension 305 of the rotation control mechanism 30 will rotate clockwise about its left end. Therefore, the flat panel display 9 supported at the display support panel member 23 will rotate substantially about its left edge.

Figure 8D:
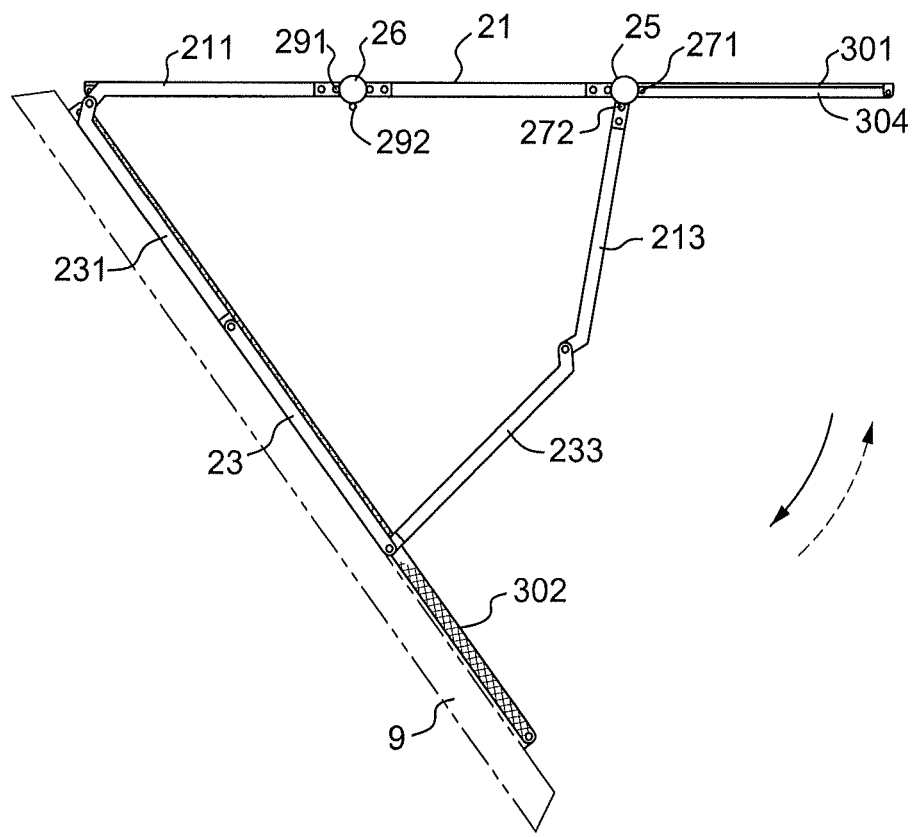

When the flat panel display remote-controlled viewing angle adjustment system 10 is rotated to a predetermined angular position (as shown in FIG. 8D), the first limit switch 272 will be turned on and the motor 251 will stop, and so will the second support panel member 213.

In the mode that the first limit switch 272 is turned on, if the first driving mechanism 25 is started once more, the motor 251 will only rotate counter-clockwise. The first driving mechanism 25 will drive the second support panel member 213 to rotate counter-clockwise about the pivot joint of the second support panel member 213 and the base support panel member 21. When the second support panel member 213 is driven to rotate counter-clockwise, the first limit switch 272 will be turned off. Thus, the display support panel member 23 and the third support panel member 231 will rotate counter-clockwise about the pivot joint of the third support panel member 231 and the fourth support panel member 211. As that rotation continues, the flat panel display remote-controlled viewing angle adjustment system 10 will rotate back to the initial position as shown in FIG. 8A, and the first the positioning switch 271 is turned on, and thus the motor 251 will stop.

Figure 9A:
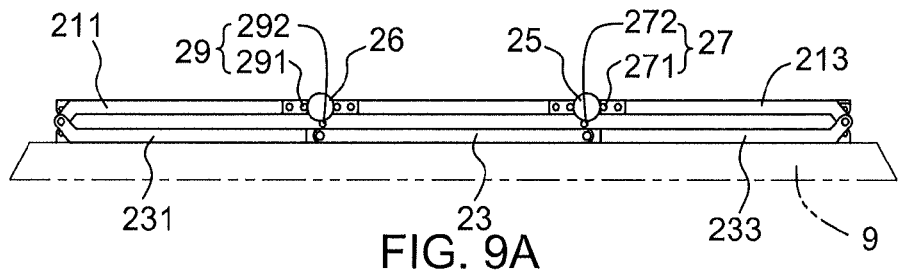
FIGS. 9A-9D show another operating process of the third embodiment of the present invention.
Figure 9B:
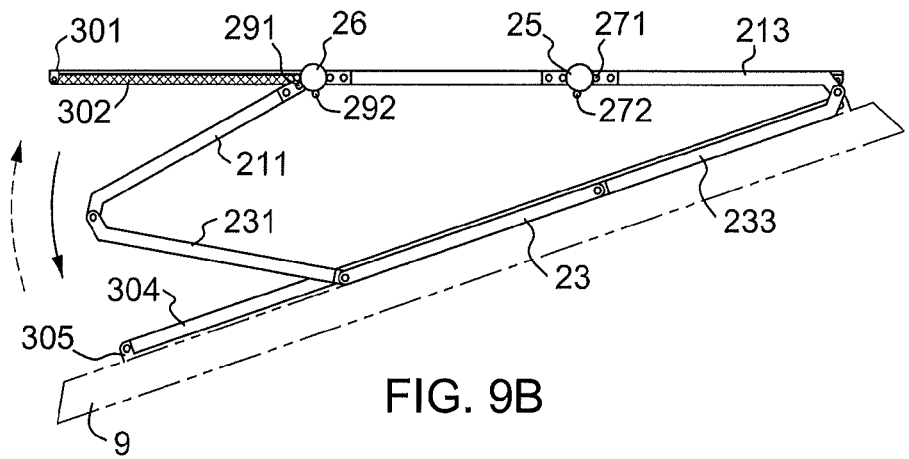
Figure 9C:
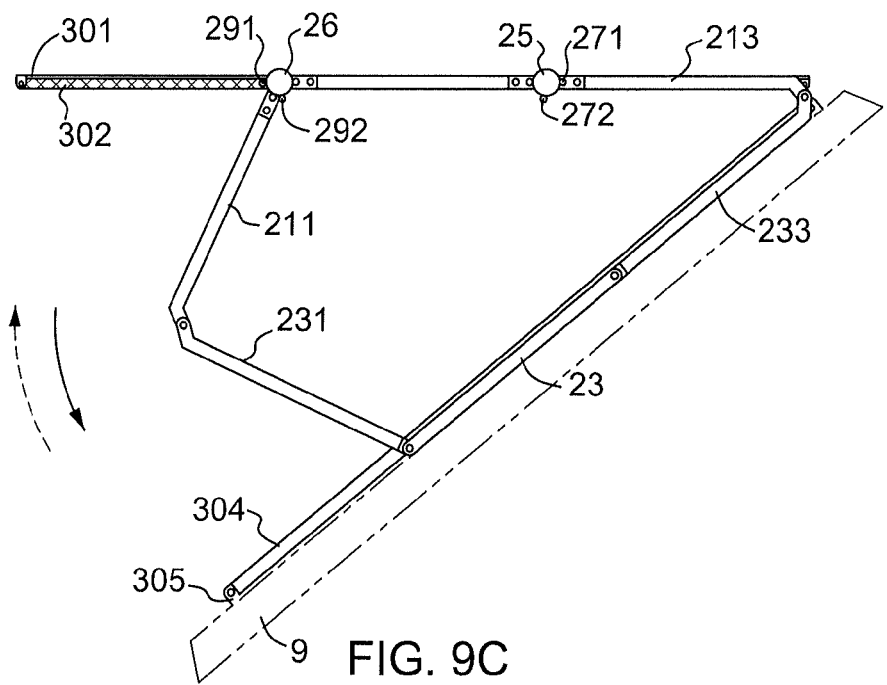

FIGS. 9A-9D show another operating process of the second embodiment of the present invention. As shown in FIG. 9A, when the flat panel display remote-controlled viewing angle adjustment system 10 is at the initial position, the base support panel member 21, the second support panel member 213, and the fourth support panel member 211 form one plane, and the display support panel member 23, the first support panel member 233, and the third support panel member 231 form another plane parallel to and directly in front of the former plane. At this position, the first positioning switch 271 and second positioning switch 291 are in the "on" mode, and the first limit switch 272 and the second limit switch 292 are in "off" mode. As shown in FIGS. 9B and 9C, when the second driving mechanism 26 is started, the motor 261 will drive the fourth support panel member 211 to rotate counter-clockwise about the pivot joint of the fourth support panel member 211 and the base support panel member 21. The second positioning switch 291 will thus be turned off, and the display support panel member 23 as well as the first support panel member 233 will rotate counter-clockwise about the pivot joint of the first support panel member 233 and the second support panel member 213. Therefore, the flat panel display 9 supported on the display support panel member 23 will rotate substantially about its right edge as shown in FIGS. 9A-9D.

When the second driving mechanism 26 continues to drive the fourth support panel member 211 to rotate counter-clockwise, the display support panel member 23 and the first support panel member 233 will rotate counter-clockwise about the pivot joint of the first support panel member 233 and the second support panel member 213 and the display support extension 305 of the rotation control mechanism 30 will rotate counter-clockwise about its right end. Therefore, the flat panel display 9 supported on the display support panel member 23 will rotate substantially about its right edge.

Figure 9D:
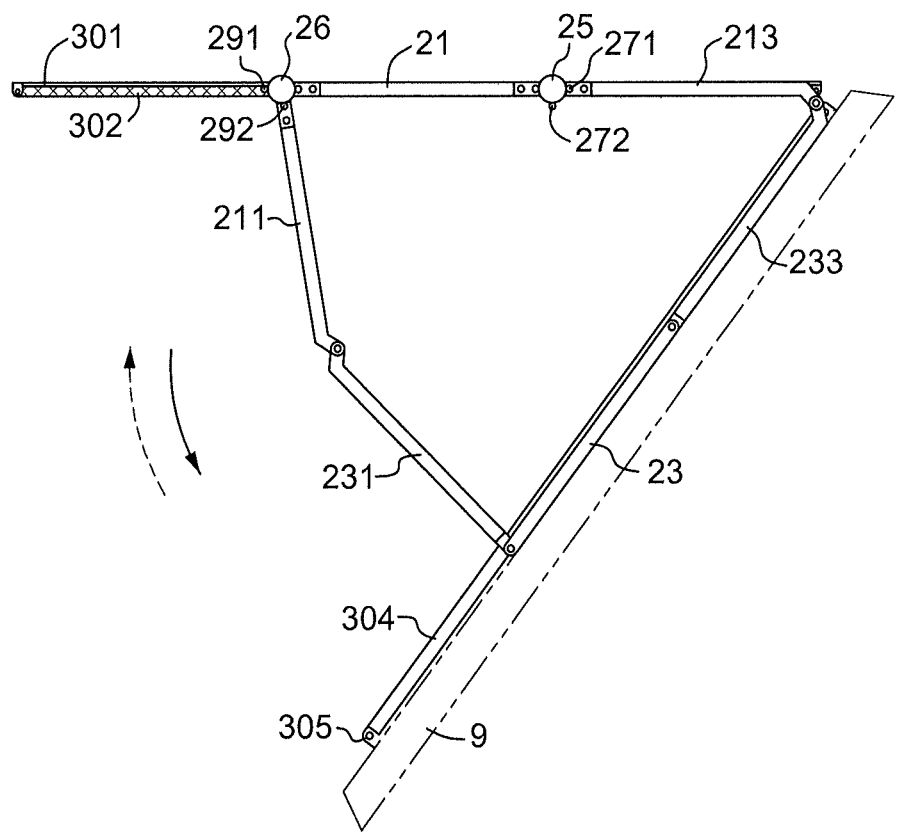

When the flat panel display remote-controlled viewing angle adjustment system 10 is rotated to a predetermined angular position (as shown in FIG. 9D), the second limit switch 292 is turned on and the motor 261 will stop, and so will the fourth support panel member 211.

In the mode that the first limit switch 292 is turned on, if the second driving mechanism 26 is started once more, it will only rotate clockwise. The second driving mechanism 26 will drive the fourth support panel member 211 to rotate clockwise about the pivot joint of the fourth support panel member 211 and the base support panel member 21. When the fourth support panel member 211 is driven to rotate clockwise, the second limit switch 272 will be turned off. Thus, the display support panel member 23 and the first support panel member 233 will rotate clockwise about the pivot joint of the first support panel member 233 and the second support panel member 213. As that rotation continues, the flat panel display remote-controlled viewing angle adjustment system 10 will rotate back to the initial position as shown in FIG. 9A, and the second positioning switch 291 is turned on, and thus the motor 261 will stop.

Figure 10:
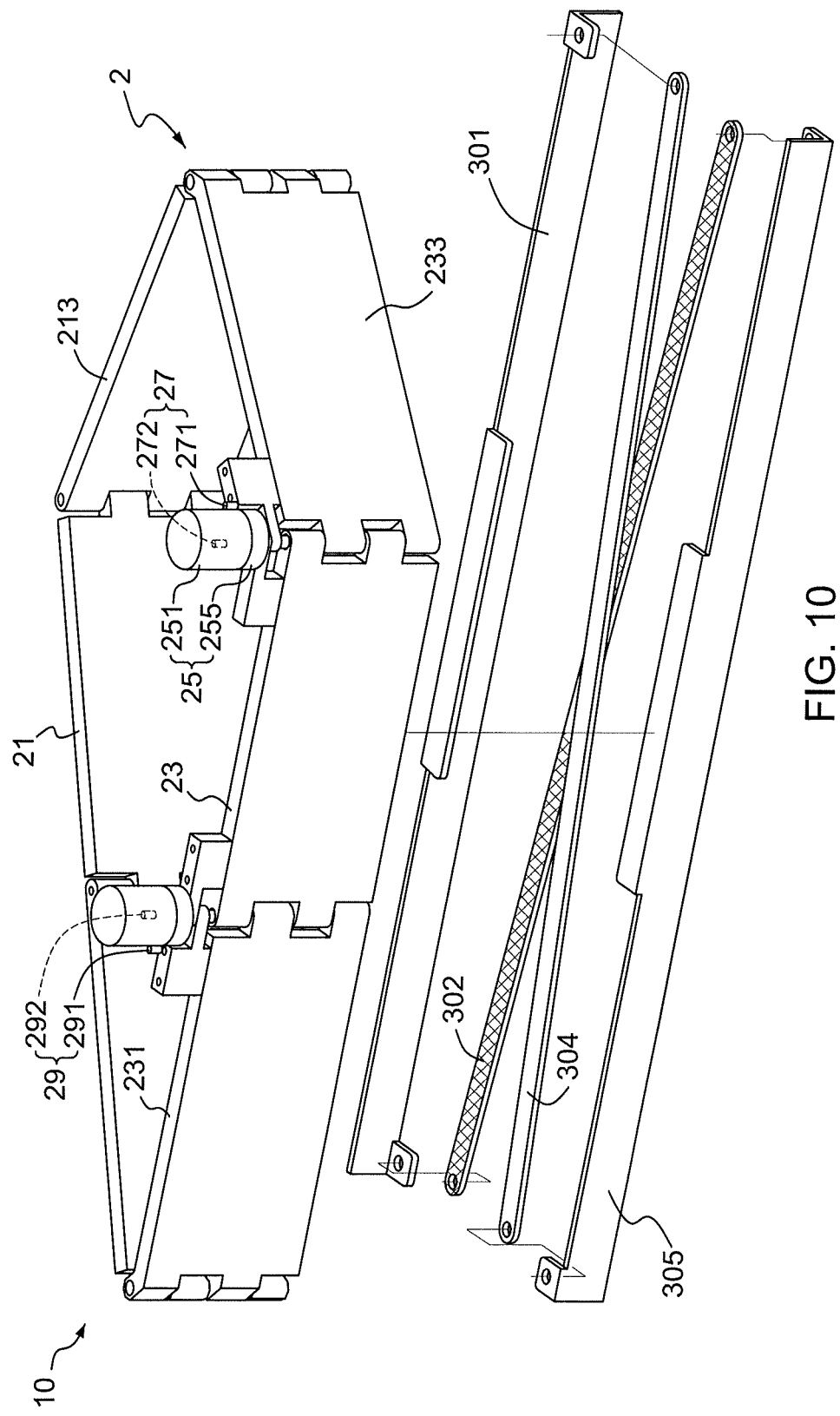
FIG. 10 shows a fourth embodiment of the flat panel display remote-controlled viewing angle adjustment system of the present invention.

FIG. 10 shows a fourth embodiment of the flat panel display remote-controlled viewing angle adjustment system 10. The structures of the support assembly 2, the first driving mechanism 25, the second mechanism 26, the first control unit 27, and the second control unit 29 are identical to those of the second embodiment. The difference between the second embodiment and the fourth embodiment is that the first electrical stopper 31 and the second electrical stopper 32 of the second embodiment are replaced with a rotation control mechanism 30. The rotation control mechanism 30 comprises a base support extension 301, a display support extension 305, a first link 302, and a second link 304. The base support extension 301 is attached to the base support panel member 21 and the display support extension 305 is attached to the display support panel member 23. Further, the left end of the first link 302 is pivotally connected to the left end of the base support extension 301 and the right end of the first link 302 is pivotally connected to the right end of the display support extension 305, and the left end of the second link 304 is pivotally connected to the left end of the display support extension 305 and the right end of the second link 304 is pivotally connected to the right end of the base support extension 301.

Figure 11A:
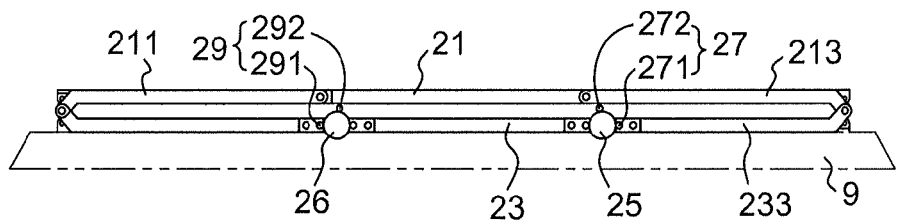
FIGS. 11A-11D show an operating process of the fourth embodiment of the present invention.
Figure 11B:
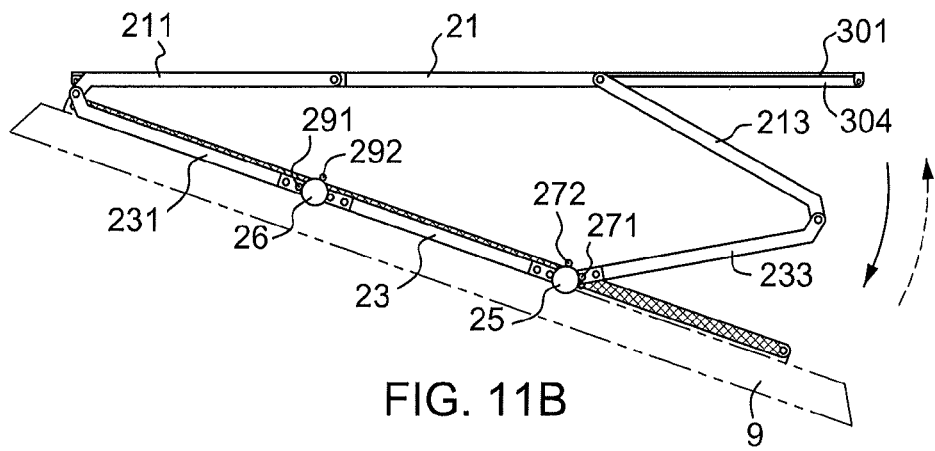
Figure 11C:
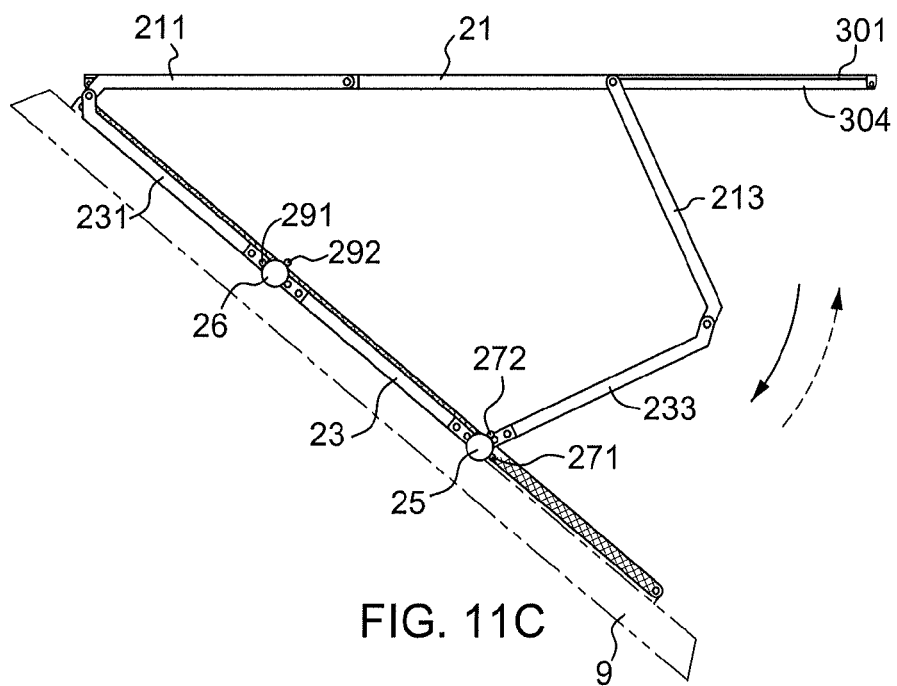

FIGS. 11A-11D show an operating process of the third embodiment of the present invention. As shown in FIG. 11A, when the flat panel display remote-controlled viewing angle adjustment system 10 is at the initial position, the base support panel member 21, the second support panel member 213, and the fourth support panel member 211 form one plane, and the display support panel member 23, the first support panel member 233, and the third support panel member 231 form another plane parallel to and directly in front of the former plane. At this position, the first positioning switch 271 and second positioning switch 291 are in the "on" mode, and the first limit switch 272 and the second limit switch 292 are in the "off" mode. As shown in FIGS. 11B and 11C, when the first driving mechanism 25 is started, the motor 251 will drive the first support panel member 233 to rotate counter-clockwise about the pivot joint of the first support panel member 233 and the display support panel member 23. The first positioning switch 271 will thus be turned off, and the display support panel member 23 as well as the third support panel member 231 will rotate clockwise about the pivot joint of the third support panel member 231 and the fourth support panel member 211. Therefore, the flat panel display 9 supported on the display support panel member 23 will rotate substantially about its left edge as shown in FIGS. 11A-11D.

When the first driving mechanism 25 continues to drive the first support panel member 233 to rotate counter-clockwise, the display support panel member 23 and the third support panel member 231 will rotate clockwise about the pivot joint of the third support panel member 231 and the fourth support panel member 211 and the display support extension 305 of the rotation control mechanism 30 will rotate clockwise about its left end. Therefore, the flat panel display 9 supported at the display support panel member 23 will rotate substantially about its left edge.

Figure 11D:
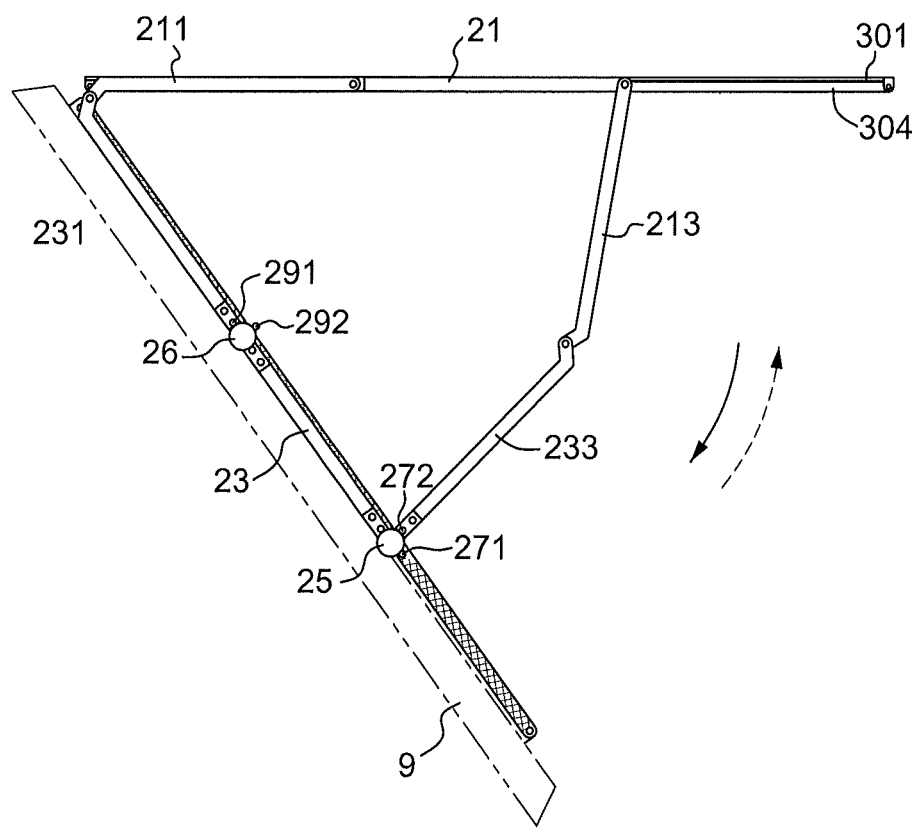

When the flat panel display remote-controlled viewing angle adjustment system 10 is rotated to a predetermined angular position (as shown in FIG. 11D), the first limit switch 272 will be turned on and the motor 251 will stop, and so will the second support panel member 213.

In the mode that the first limit switch 272 is turned on, if the first driving mechanism 25 is started once more, the motor 251 will only rotate clockwise. The first driving mechanism 25 will drive the first support panel member 233 to rotate clockwise about the pivot joint of the first support panel member 233 and the display support panel member 23. When the first support panel member 233 is driven to rotate clockwise, the first limit switch 272 will be turned off. Thus, the display support panel member 23 and the third support panel member 231 will rotate counter-clockwise about the pivot joint of the third support panel member 231 and the fourth support panel member 211. As that rotation continues, the flat panel display remote-controlled viewing angle adjustment system 10 will rotate back to the initial position as shown in FIG. 11A, and the first the positioning switch 271 is turned on, and thus the motor 251 will stop.

Figure 12A:
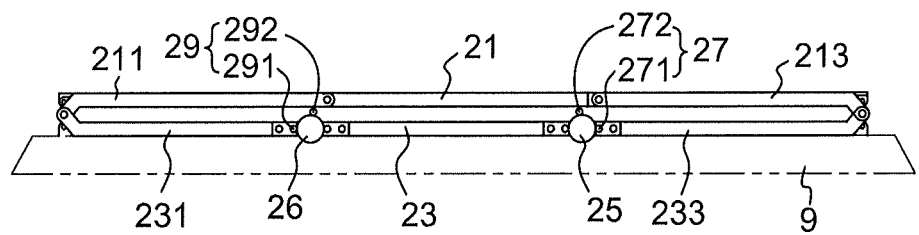
FIGS. 12A-12D show another operating process of the fourth embodiment of the present invention.
Figure 12B:
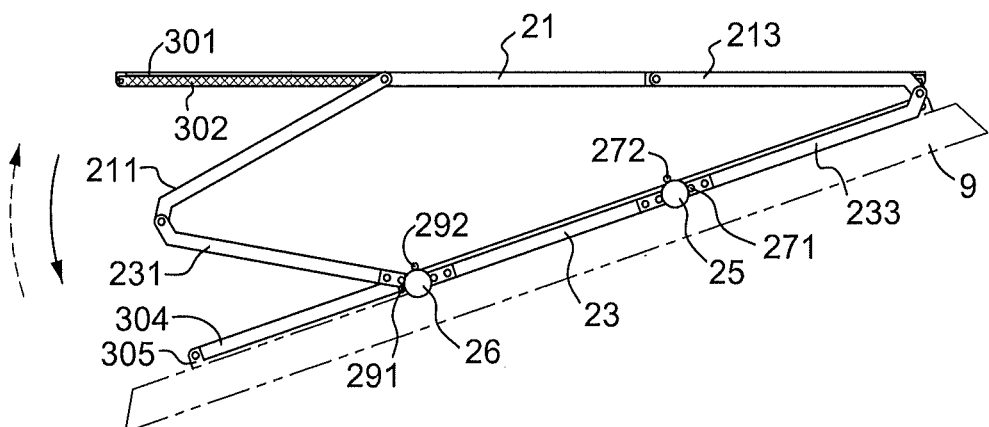
Figure 12C:
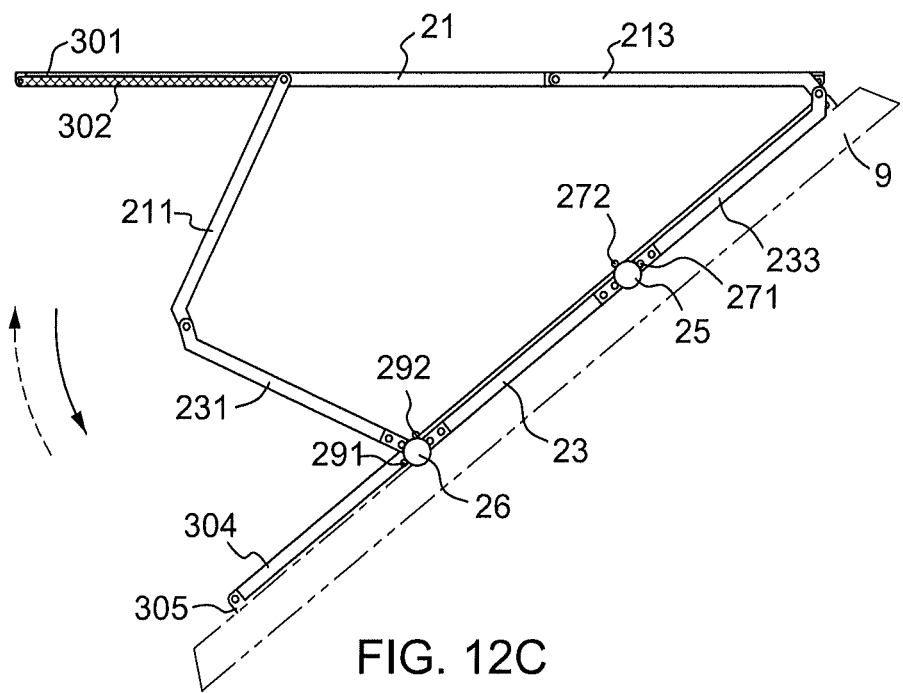

FIGS. 12A-12D show another operating process of the fourth embodiment of the present invention. As shown in FIG. 12A, when the flat panel display remote-controlled viewing angle adjustment system 10 is at the initial position, the base support panel member 21, the second support panel member 213, and the fourth support panel member 211 form one plane, and the display support panel member 23, the first support panel member 233, and the third support panel member 231 form another plane parallel to and directly in front of the former plane. At this position, the first positioning switch 271 and second positioning switch 291 are in the "on" mode, and the first limit switch 272 and the second limit switch 292 are in "off" mode. As shown in FIGS. 12B and 12C, when the second driving mechanism 26 is started, the motor 261 will drive the third support panel member 231 to rotate clockwise about the pivot joint of the third support panel member 231 and the display support panel member 23. The second positioning switch 291 will thus be turned off, and the display support panel member 23 as well as the first support panel member 233 will rotate counter-clockwise about the pivot joint of the first support panel member 233 and the second support panel member 213. Therefore, the flat panel display 9 supported on the display support panel member 23 will rotate substantially about its right edge as shown in FIGS. 12A-12D.

When the second driving mechanism 26 continues to drive the third support panel member 231 to rotate clockwise, the display support panel member 23 and the first support panel member 233 will rotate counter-clockwise about the pivot joint of the first support panel member 233 and the second support panel member 213 and the display support extension 305 of the rotation control mechanism 30 will rotate counter-clockwise about its right end. Therefore, the flat panel display 9 supported on the display support panel member 23 will rotate substantially about its right edge.

Figure 12D:
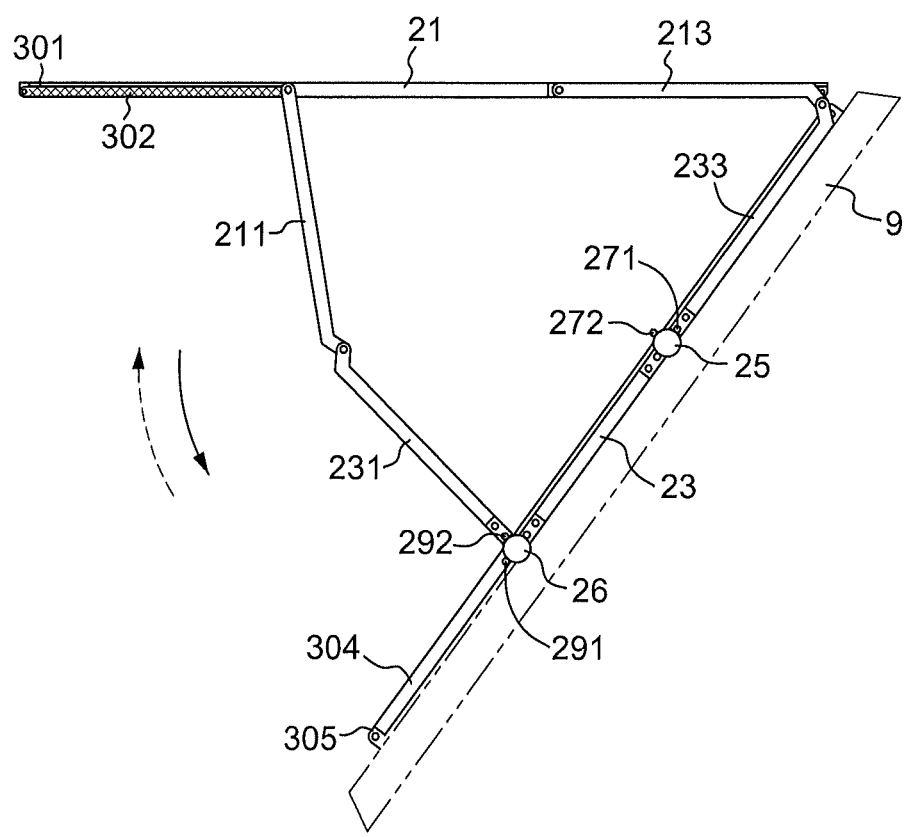

When the flat panel display remote-controlled viewing angle adjustment system 10 is rotated to a predetermined angular position (as shown in FIG. 12D), the second limit switch 292 is turned on and the motor 261 will stop, and so will the fourth support panel member 211.

In the mode that the first limit switch 292 is turned on, if the second driving mechanism 26 is started once more, it will only rotate counter-clockwise. The second driving mechanism 26 will drive the third support panel member 231 to rotate counter-clockwise about the pivot joint of the third support panel member 231 and the display support panel member 23. When the third support panel member 231 is driven to rotate counter-clockwise, the second limit switch 272 will be turned off. Thus, the display support panel member 23 and the first support panel member 233 will rotate clockwise about the pivot joint of the first support panel member 233 and the second support panel member 213. As that rotation continues, the flat panel display remote-controlled viewing angle adjustment system 10 will rotate back to the initial position as shown in FIG. 12A, and the second positioning switch 291 is turned on, and thus the motor 261 will stop.

Figure 13:
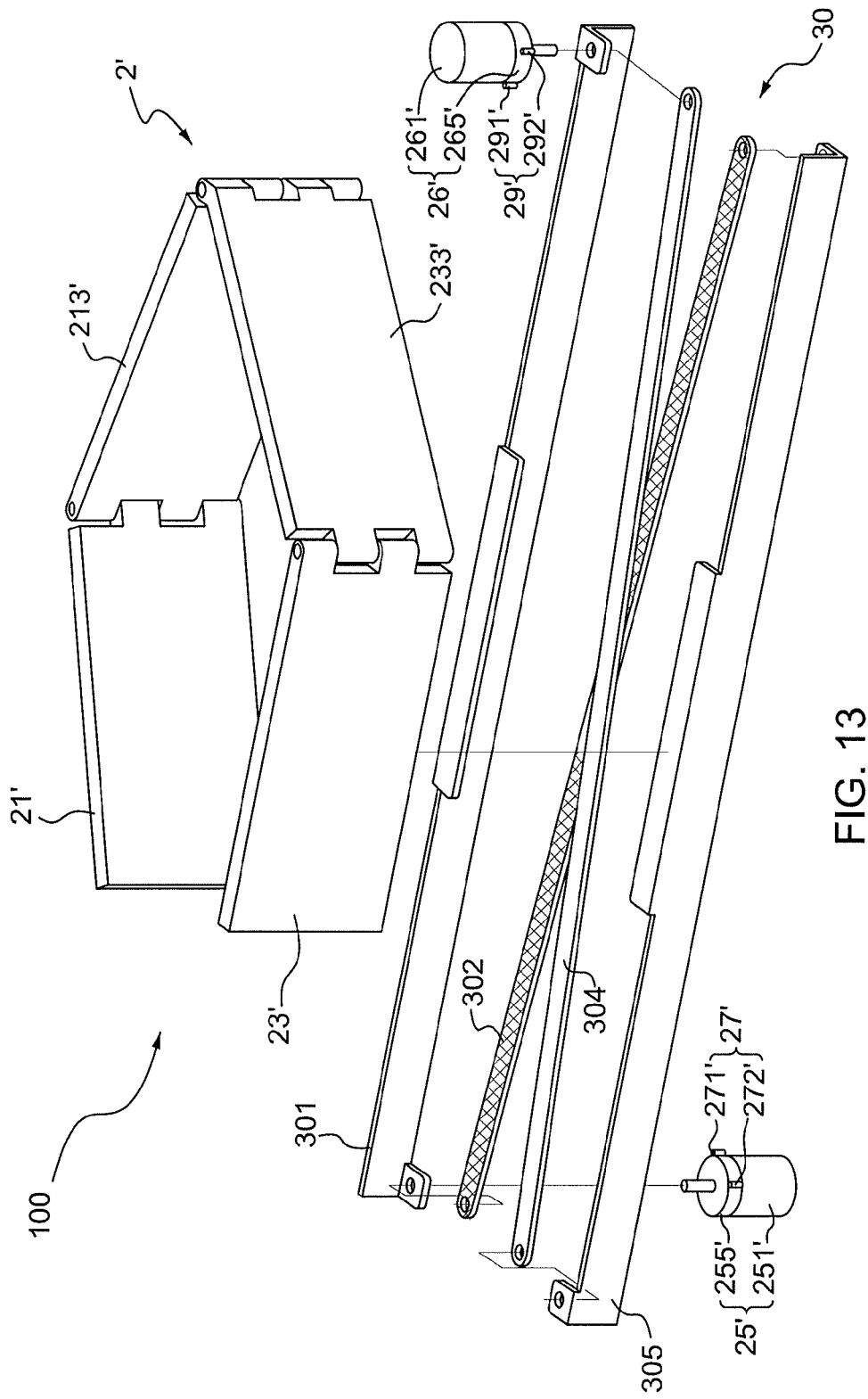
FIG. 13 shows a fifth embodiment of the flat panel display remote-controlled viewing angle adjustment system of the present invention.

FIG. 13 shows a fifth embodiment of the flat panel display remote-controlled viewing angle adjustment system 100. The system 100 comprises a support assembly 2', which further comprises a base support panel member 21', a display support panel member 23', a first support panel member 233', and a second support panel member 213'. The base support panel member 21' can be fixed to a support or on a wall and the display support panel member 23' is to support a flat panel display 9. The right edge of the base support panel member 21' is pivotally connected to the left edge of the second support panel member 213'. The right edge of the display support panel member 23' is pivotally connected to the left edge of the first support panel member 233'. Moreover, the right edge of the first support panel member 233' is pivotally connected to the right edge of the second support panel member 213'.

Further, a rotation control mechanism 30 is attached to the support assembly 2'. The rotation control mechanism 30 comprises a base support extension 301, a display support extension 305, a first link 302 and, a second link 304. The base support extension 301 is attached to the base support panel member 21' of the support assembly 2' and the display support extension 305 is attached to the display support panel member 23' of the support assembly 2'. Further, the left end of the first link 302 is pivotally connected to the left end of the base support extension 301 and the right end of the first link 302 is pivotally connected to the right end of the display support mechanism 305, and the left end of the second link 304 is pivotally connected to the left end of the display support extension 305 and the right end of the second link 304 is pivotally connected to the right end of the base support extension 301.

A first driving mechanism 25' is arranged substantially at the pivot joint of the base support extension 301 and the first link 302. The first driving mechanism 25' comprises a motor 251' and a gear box 255' for reducing the speed of the motor 251'. When the motor 251' is started, the first driving mechanism 25' will drive the first link 302 to rotate about the pivot joint of the base support extension 301 and the first link 302. A first control unit 27' is arranged substantially at the pivot joint of the base support extension 301 and the first link 302 and electrically connected to the first driving mechanism 25'. In particular, the first control unit 27' is attached to the first driving mechanism 25'. Further, the first control unit 27' comprises a first positioning switch 271' and a first limit switch 272'.

A second driving mechanism 26' is arranged substantially at the pivot joint of the base support extension 301 and the second link 304. The second driving mechanism 26' comprises a motor 261' and a gear box 265' for reducing the speed of the motor 261'. When the motor 261' is started, the second driving mechanism 26' will drive the second link 304 to rotate about the pivot joint of the base support extension 301 and the second link 304. A second control unit 29' is arranged substantially at the pivot joint of the base support extension 301 and the second link 304 and electrically connected to the second driving mechanism 26'. In particular, the second control unit 29' is attached to the second driving mechanism 26'. Further, the second control unit 29' comprises a second positioning switch 291' and a second limit switch 292'.

Further, the first driving mechanism 25' and the second driving mechanism 26' can be remotely controlled.

In addition, the first positioning switch 271' and the first limit switch 272' cooperate with the motor 251'. When the first positioning switch 271' or the first limit switch 272' is turned on, the motor 251' will stop. Likewise, the second positioning switch 291' and the second limit switch 292' cooperate with the motor 261'. When the second positioning switch 291' or the second limit switch 292' is turned on, the motor 261' will stop.

Figure 14A:
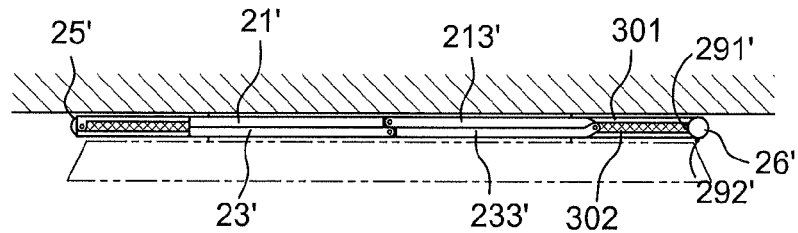
FIGS. 14A-14D show an operating process of the fifth embodiment of the present invention.
Figure 14B:
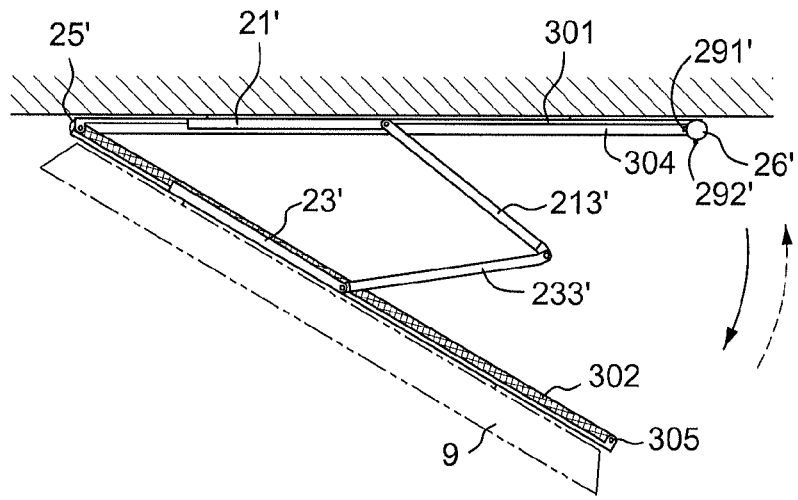
Figure 14C:
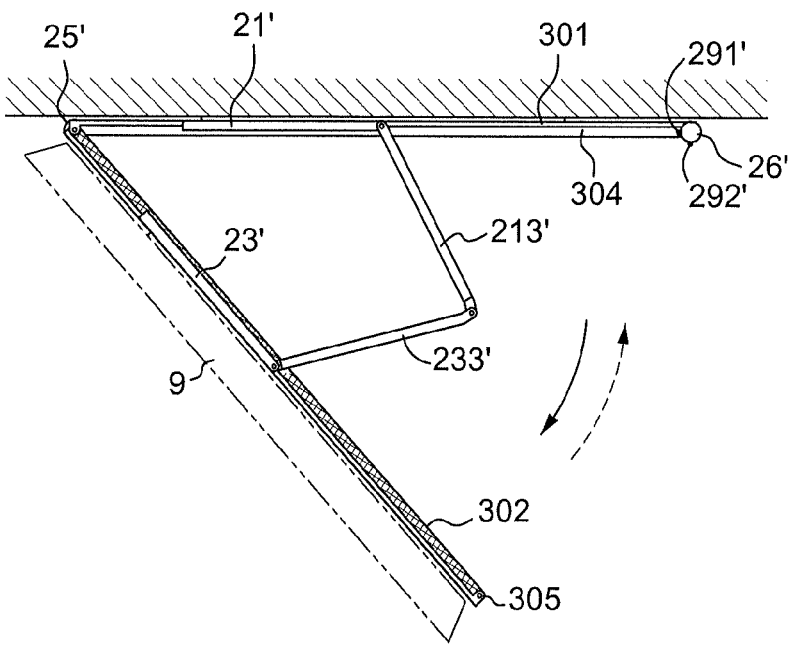

FIGS. 14A-14D show an operating process of the fifth embodiment of the present invention. As shown in FIG. 14A, when the flat panel display remote-controlled viewing angle adjustment system 100 is at the initial position, the base support panel member 21' and the second support panel member 213' form one plane, and the display support panel member 23' and the first support panel member 233' form another plane parallel to and directly in front of the former plane. At this position, the first positioning switch 271' and second positioning switch 291' are in the "on" mode, and the first limit switch 272' and the second limit switch 292' are in the "off" mode. As shown in FIGS. 14B and 14C, when the first driving mechanism 25' is started, the motor 251' will drive the first link 302 to rotate clockwise about the pivot joint of the base support extension 301 and the first link 302. The first positioning switch 271' will thus be turned off, and the display support extension 305 of the rotation control mechanism 30 will rotate clockwise about its left end. Therefore, the flat panel display 9 supported at the display support panel member 23' will rotate about its left edge as shown in FIGS. 14A-14D.

Figure 14D:
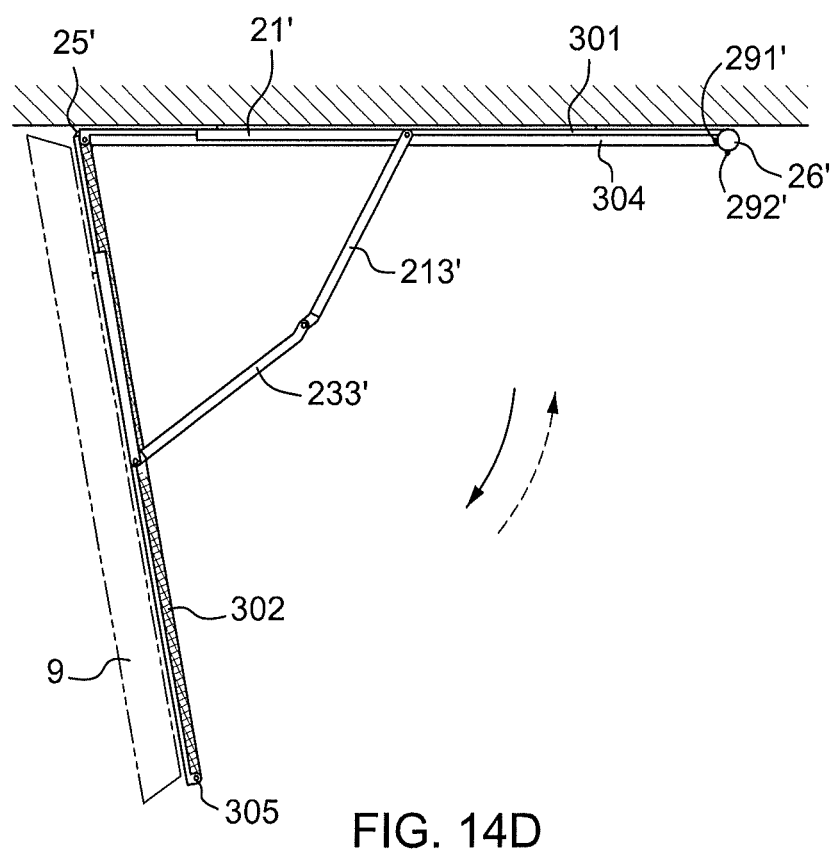

When the flat panel display remote-controlled viewing angle adjustment system 100 is rotated to a predetermined angular position (as shown in FIG. 14D), the first limit switch 272' will be turned on and the motor 251' will stop, and so will the second support panel member 213'.

In the mode that first limit switch 272' is turned on, if the first driving mechanism 25' is started once more, the motor 251' will only rotate counter-clockwise. Thus, the first limit switch 272' is turned off. Further, the first driving mechanism 25' will drive the first link 302 to rotate counter-clockwise about the pivot joint of the base support extension 301 and the first link 302. Thus, the display support extension 305 of the rotation control mechanism 30 will rotate counter-clockwise about its left end. Finally, the flat panel display remote-controlled viewing angle adjustment system 100 will rotate back into its initial position, and the first the positioning switch 271' is turned on and the motor 251' will stop.

Figure 15A:
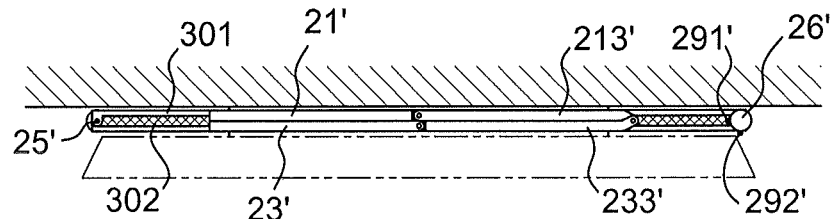
FIGS. 15A-15D show another operating process of the fifth embodiment of the present invention.
Figure 15B:
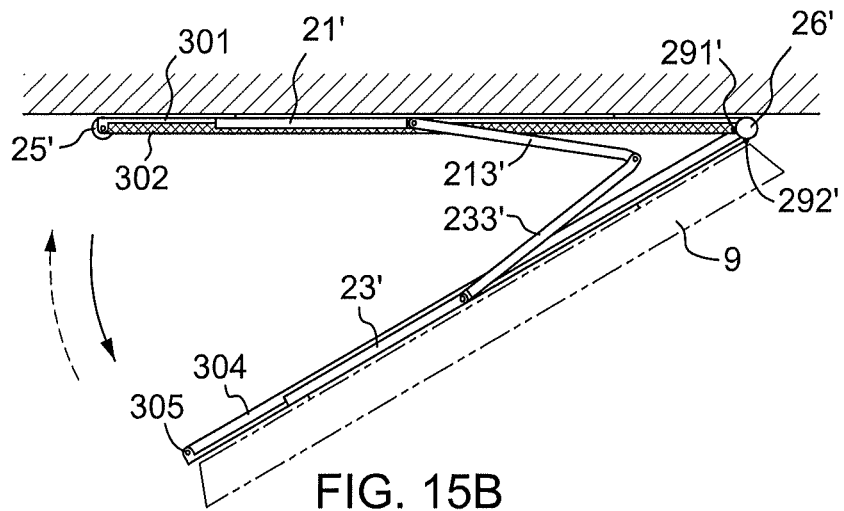
Figure 15C:
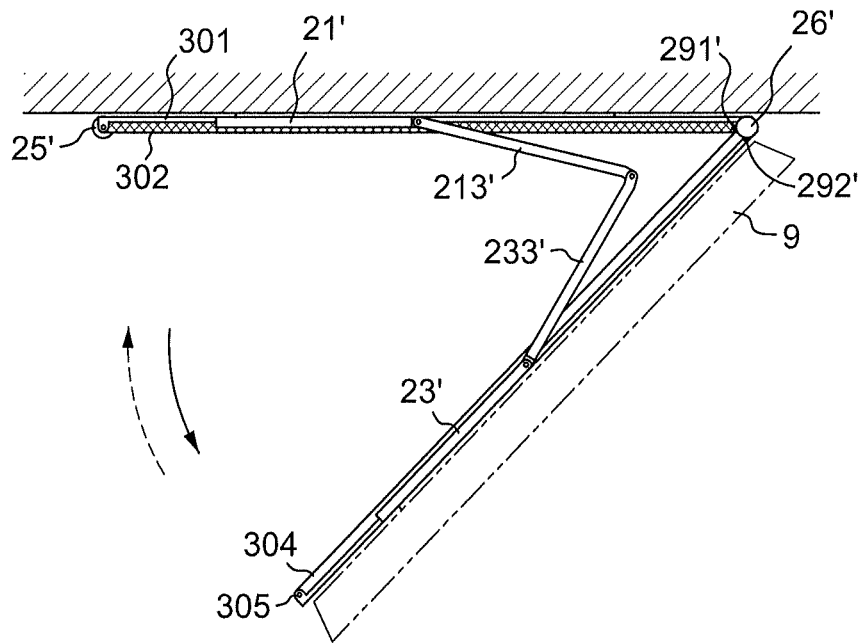

FIGS. 15A-15D show another operating process of the fifth embodiment of the present invention. As shown in FIG. 15A, when the flat panel display remote-controlled viewing angle adjustment system 100 is at the initial position, the base support panel member 21' and the second support panel member 213' form one plane, and the display support panel member 23' and the first support panel member 233' form another plane parallel to and directly in front of the former plane. At this position, the first positioning switch 271' and second positioning switch 291' are in the "on" mode, and the first limit switch 272' and the second limit switch 292' are in the "off" mode. As shown in FIGS. 15B and 15C, when the second driving mechanism 26' is started, the motor 261' is started and the second positioning switch 291' is turned off. Further, the second driving mechanism 26' will drive the second link 304 to rotate counter-clockwise about the pivot joint of the base support extension 301 and the second link 304. The display support extension 305 of the rotation control mechanism 30 will rotate counter-clockwise about its right end. Therefore, the flat panel display 9 supported at the display support panel member 23' will rotate about its right edge as shown in FIGS. 15A-15D.

Figure 15D:
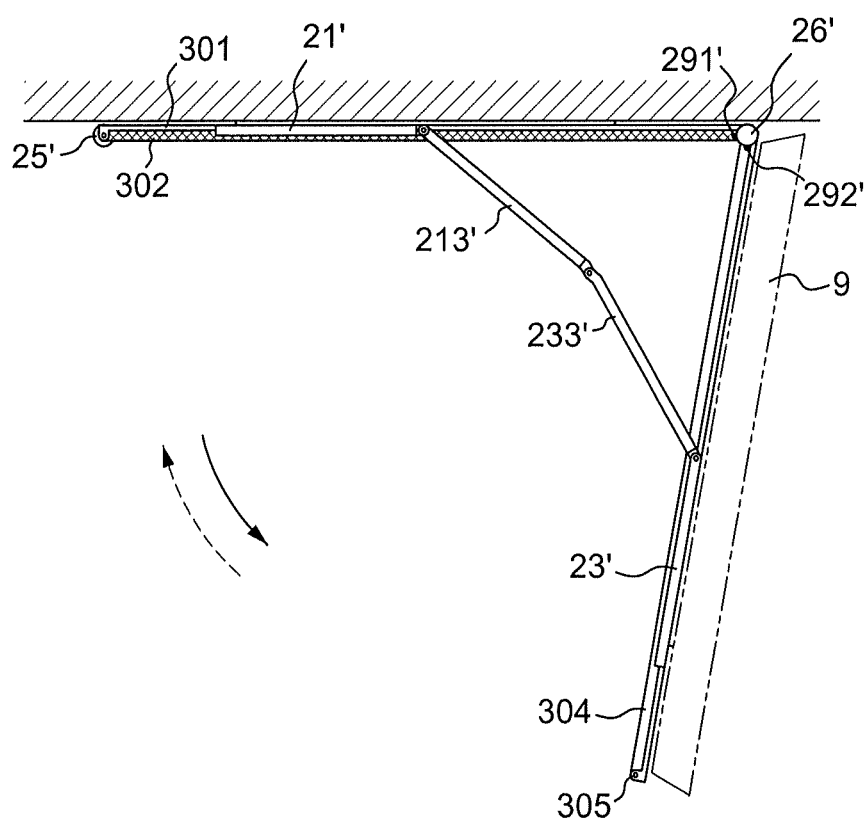

When the flat panel display remote-controlled viewing angle adjustment system 100 is rotated to a predetermined angular position (as shown in FIG. 15D), the second limit switch 292' is turned on and the motor 261' will be stop, and so will the first support panel member 233' and the second support panel member 213'.

In the mode that the second limit switch 292' is turned on, if the second driving mechanism 26' is actuated once more, the motor 261' will only rotate clockwise. Thus, the second limit switch 292' will be turned off. The second link 304 will rotate clockwise about the pivot joint of the base support extension 301 and the second link 304. Thus, the display support extension 305 of the rotation control mechanism 30 will rotate clockwise about its right end. Finally, the flat panel display remote-controlled viewing angle adjustment system 100 will rotate back into its initial position, and the second the positioning switch 291' is turned on and the motor 261' will stop.

Figure 16:
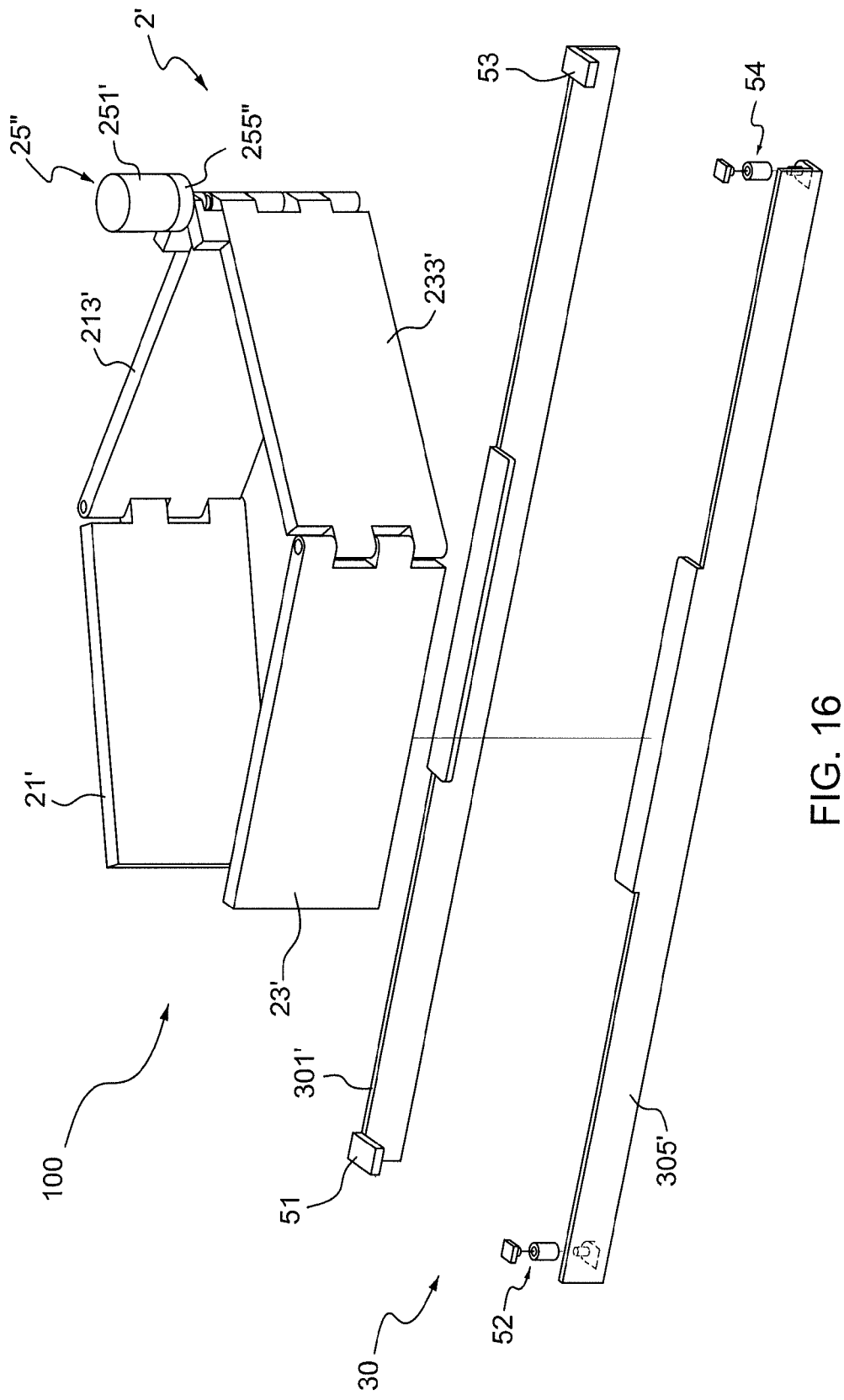
FIG. 16 shows a sixth embodiment of the flat panel display remote-controlled viewing angle adjustment system of the present invention.

FIG. 16 shows a sixth embodiment of the flat panel display remote-controlled viewing angle adjustment system 100. The system 100 comprises a support assembly 2', which further comprises a base support panel member 21'; a display support panel member 23'; a first support panel member 233', and a second support panel member 213'. The base support panel member 21' can be fixed to a support or on a wall and the display support panel member 23' is to support a flat panel display 9. The right edge of the base support panel member 21' is pivotally connected to the left edge of the second support panel member 213'. The right edge of the display support panel member 23' is pivotally connected to the left edge of the first support panel member 233'. Moreover, the right edge of the first support panel member 233' is pivotally connected to the right edge of the second support panel member 213'.

Further, a rotation control mechanism 30' is attached to the support assembly 2'. The rotation control mechanism 30' comprises a base support extension 301'; a display support extension 305'; a first electromagnet 51 arranged at the left end of the base support extension 301'; a first attachment 52 rotatably arranged at the left end of the display support extension 305' and used to be attached to the first electromagnet 51; a second electromagnet 53 arranged at the right end of the base support extension 301'; a second attachment 54 rotatably arranged at the right end of the display support extension 305' and used to be attached to the second electromagnet 51; and a control unit (not shown) electrically connected to the two electromagnets 51, 53. Moreover the base support extension 301' is attached to the base support panel member 21' of the support assembly 2' and the display support extension 305' is attached to the display support panel member 23' of the support assembly 2'.

A driving mechanism 25 is arranged substantially at the pivot joint of the first support panel member 233' and the second support panel member 213'. The driving mechanism 25" comprises a motor 251" and a gear box 255" for reducing the speed of the motor 251". When the motor 251" is started, the driving mechanism 25" will drive the first support panel member 233' to rotate about the pivot joint of the first support panel member 233' and the second support panel member 213'. Further, the driving mechanism 25" can be remotely controlled.

Figure 17A:
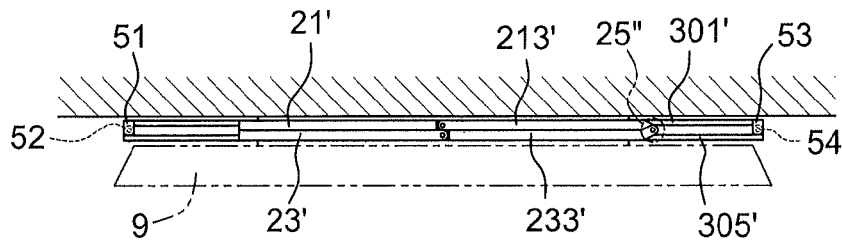
FIGS. 17A-17D show an operating process of the sixth embodiment of the present invention.
Figure 17B:
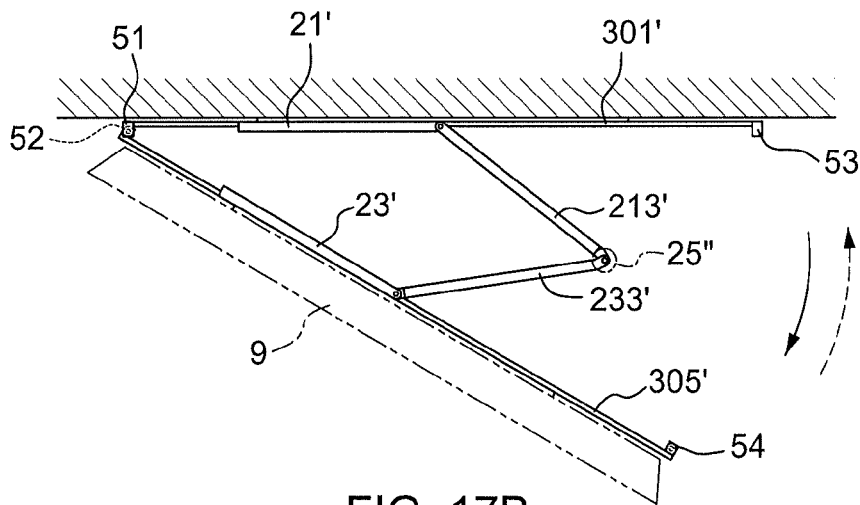
Figure 17C:
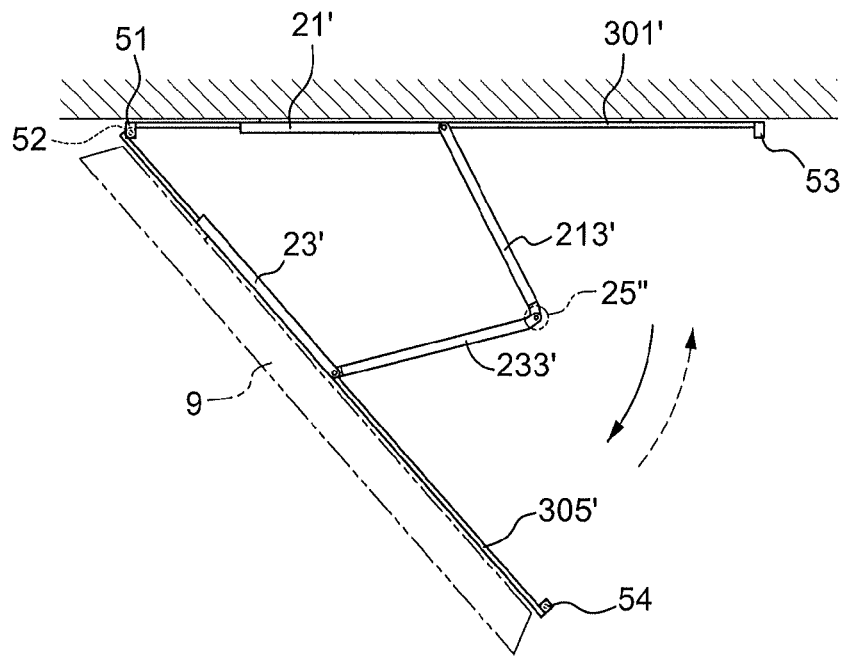
Figure 17D:
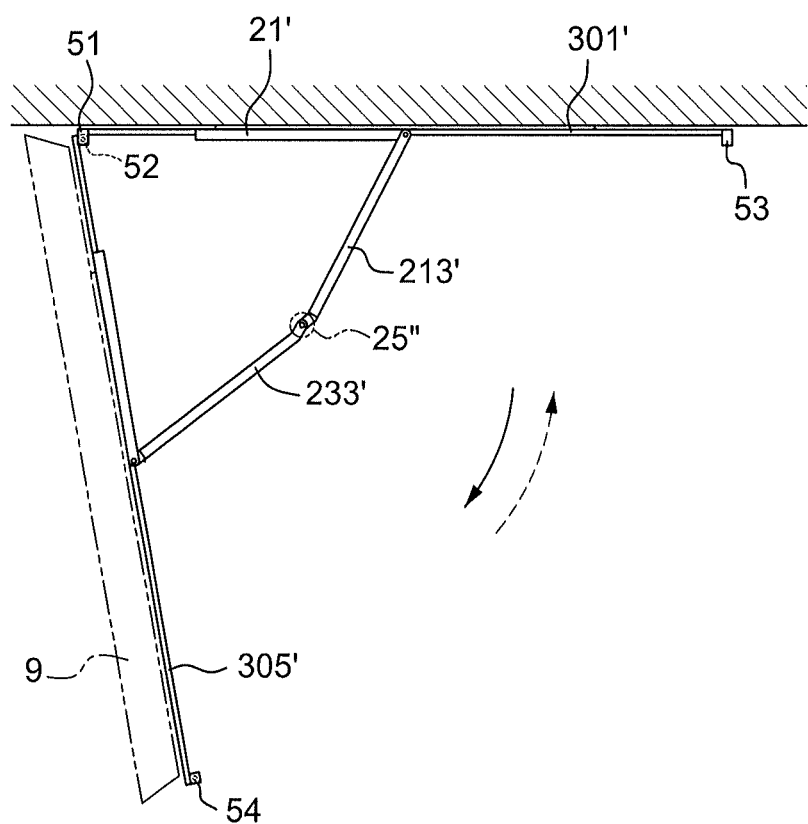

FIGS. 17A-17D show an operating process of the sixth embodiment of the present invention. As shown in FIG. 17A, when the flat panel display remote-controlled viewing angle adjustment system 100 is at the initial position, the electromagnets 51 and 53 are in an unactivated state, and the base support panel member 21' and the second support panel member 213' form one plane, and the display support panel member 23' and the first support panel member 233' form another plane parallel to and directly in front of the former plane. As shown in FIGS. 17B-17D, when the driving mechanism 25' is started, the control unit will only activate the first electromagnet 51 to attach to the first attachment 52 so as to form a left pivot joint of the rotation control mechanism 30'. Further, the motor 251" will drive the first support panel member 233' such that the display support extension 305' rotates clockwise about the left pivot joint of the rotation control mechanism 30'. Therefore, the flat panel display 9 supported at the display support panel member 23' will rotate about its left edge as shown in FIGS. 17A-17D to a predetermined angular position (as shown in FIG. 17D).

When the flat panel display remote-controlled viewing angle adjustment system 100 is rotated to a predetermined angular position (as shown in FIG. 17D), the user can control the motor 251" to rotate reversely such that the flat panel display remote-controlled viewing angle adjustment system 100 rotates back into its initial position. Once the flat panel display remote-controlled viewing angle adjustment system 100 at its initial position, the first electromagnet 51 will return to an unactivated state.

Figure 18A:
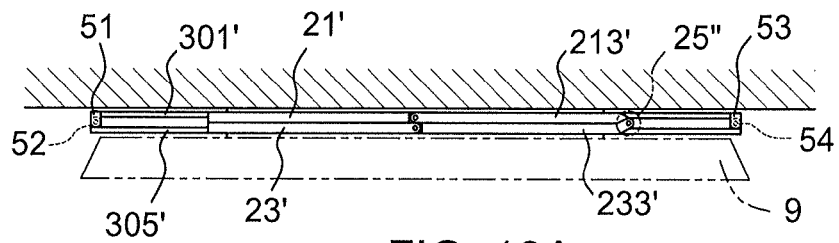
FIGS. 18A-18D show another operating process of the sixth embodiment of the present invention.
Figure 18B:
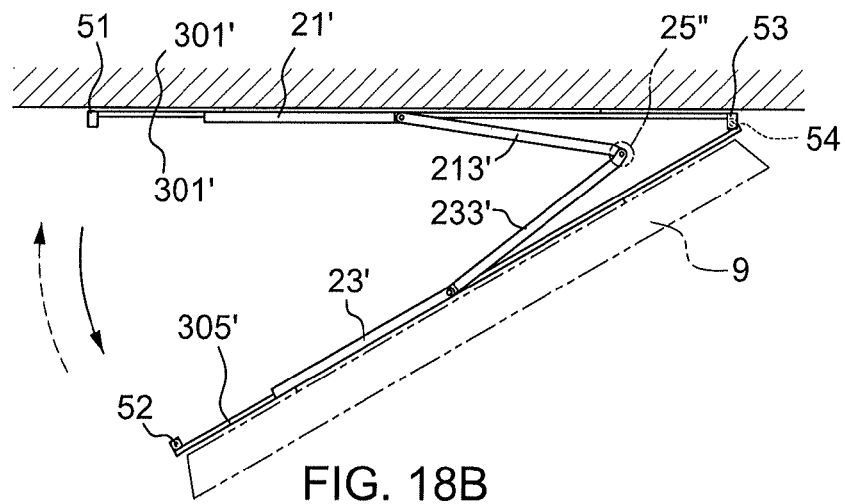
Figure 18C:
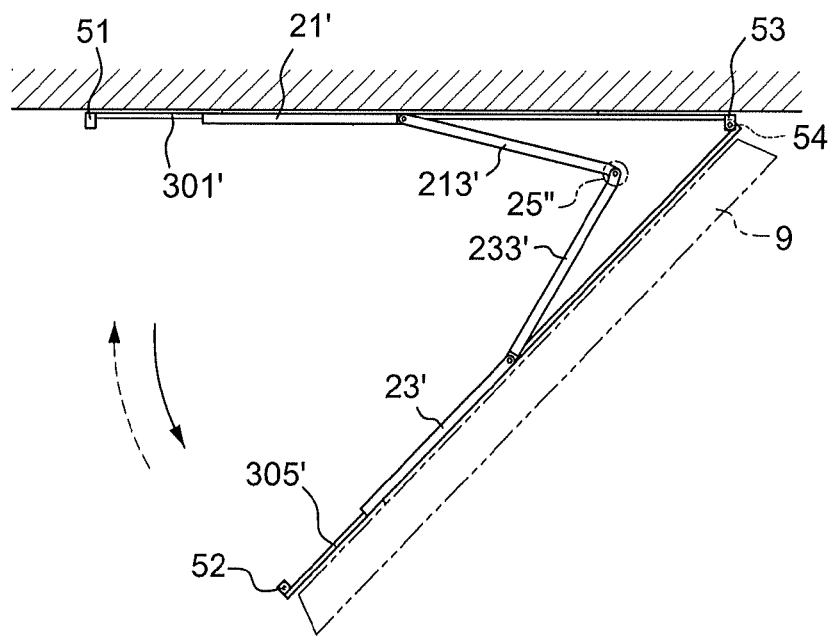
Figure 18D:
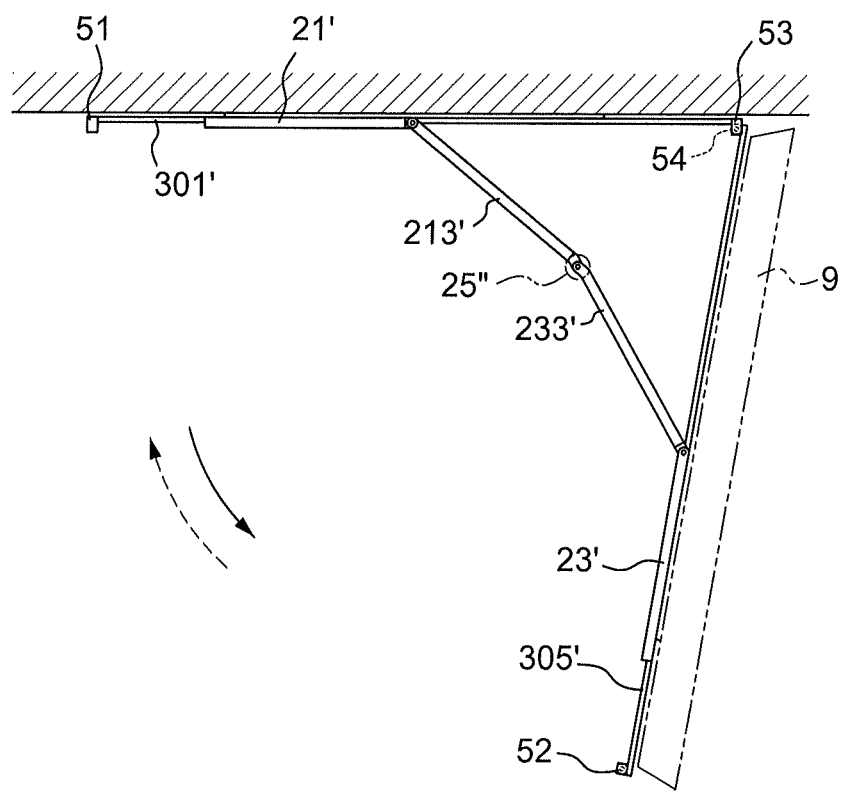

FIGS. 18A-18D show another operating process of the sixth embodiment of the present invention. As shown in FIG. 18A, when the flat panel display remote-controlled viewing angle adjustment system 100 is at the initial position, the electromagnets 51 and 53 are in an unactivated state, and the base support panel member 21' and the second support panel member 213' form one plane, and the display support panel member 23' and the first support panel member 233' form another plane parallel to and directly in front of the former plane. As shown in FIGS. 18B-18D, when the driving mechanism 25' is started, the control unit will activate the second electromagnet 53 to attach to the second attachment 54 so as to form a right pivot joint of the rotation control mechanism 30'. Further, the motor 251" will drive the first support panel member 233' such that the display support extension 305' rotates counter-clockwise about the right pivot joint. Therefore, the flat panel display 9 supported at the display support panel member 23' will rotate about its right edge as shown in FIGS. 18A-18D to a predetermined angular position (as shown in FIG. 18D).

When the flat panel display remote-controlled viewing angle adjustment system 100 is rotated to a predetermined angular position (as shown in FIG. 18D), the user can control the motor 251" to rotate reversely such that the flat panel display remote-controlled viewing angle adjustment system 100 rotates back into its initial position. Once the flat panel display remote-controlled viewing angle adjustment system 100 is at its initial position, the second electromagnet 53 will return to an unactivated state.

The invention may also be implemented in other specific modes without departing from the spirit of the invention. Thus, the above-mentioned embodiments shall be regarded as explanatory but not restrictive. All changes that are consistent with the meaning and range of the claims and the equivalents shall fall within the scope claimed by the invention.

What is claimed is:

1. A flat panel display remote-controlled viewing angle adjustment system, comprising:
   a support assembly for supporting a flat panel display; wherein the support assembly comprises: a base support panel member fixed to a support surface; a display support panel member for supporting the flat panel display; a first support panel member with its left edge pivotally connected to a right edge of the display support panel member; and a second support panel member with its left edge pivotally connected to a right edge of the base support panel member and its right edge pivotally connected to a right edge of the first support panel member; and
   an electrical driving assembly for driving the support assembly being mounted on the support assembly; and
   a dual-axis angular control assembly attached to the support assembly such that when the electrical driving assembly is started, the flat panel display is rotated about a first vertical axis that passes through either a left side or a right side of the flat panel display and only when the flat panel display returns to a zero angle position, wherein a zero angle between the base support panel member and the display support panel member, can it rotate about a second vertical axis that passes through the other side of the flat panel display wherein the angular control assembly is a rotation control mechanism comprising:
   a base support extension; a display support extension;
   a first electromagnet arranged at one end of the base support extension;
   a first attachment rotatably arranged at one end of the display support extension and used to attach to the first electromagnet such that a first pivot joint is formed when the first electromagnet is attached to the first attachment;
   a second electromagnet arranged at the other end of the base support extension; a second attachment rotatably arranged at the other end of the display support extension and used to attach to the second electromagnet such that a second pivot joint is formed when the second electromagnet is attached to the second attachment; and
   a control unit electrically connected to and selectively activated either one of the first electromagnet or the second electromagnet while the flat panel display returns to the zero angle position; and the rotation control mechanism switches between the first and second pivot joints.

2. The system according to claim 1, wherein the electrical driving assembly is mounted substantially at the pivot joint of the second support panel member and the first support panel member.

3. The system according to claim 2, wherein the driving mechanism comprises a motor and a gear box.

4. The system according to claim 1, wherein the electrical driving assembly is mounted substantially at the pivot joint of the second support panel member and the first support panel member.

5. The system according to claim 4, wherein the driving mechanism comprises a motor and a gear box.

6. The system according to claim 1, wherein the base support extension is attached to the base support panel member and the display support extension is attached to the display support panel member.

* * * * *